United States Patent
Patil et al.

(10) Patent No.: US 11,410,325 B2
(45) Date of Patent: Aug. 9, 2022

(54) CONFIGURATION OF AUDIO REPRODUCTION SYSTEM

(71) Applicant: SONY CORPORATION, Tokyo (JP)

(72) Inventors: Sharanappagouda Patil, Bangalore (IN); Kaneaki Fujishita, Bangalore (IN)

(73) Assignee: SONY CORPORATION, Tokyo (JP)

( * ) Notice: Subject to any disclaimer, the term of this patent is extended or adjusted under 35 U.S.C. 154(b) by 318 days.

(21) Appl. No.: 16/707,148

(22) Filed: Dec. 9, 2019

(65) Prior Publication Data

US 2021/0174535 A1 Jun. 10, 2021

(51) Int. Cl.
*G06T 7/70* (2017.01)
*G06T 15/00* (2011.01)
*G02B 27/01* (2006.01)
*G06N 20/00* (2019.01)

(52) U.S. Cl.
CPC ............ *G06T 7/70* (2017.01); *G02B 27/0172* (2013.01); *G06N 20/00* (2019.01); *G06T 15/005* (2013.01); *G06T 2207/10012* (2013.01); *G06T 2207/20081* (2013.01)

(58) Field of Classification Search
None
See application file for complete search history.

(56) References Cited

U.S. PATENT DOCUMENTS

| | | | |
|---|---|---|---|
| 9,980,076 B1 | 5/2018 | Pratt et al. | |
| 10,038,964 B2 | 7/2018 | Bostick et al. | |
| 2014/0270282 A1* | 9/2014 | Tammi | H04S 7/308 381/300 |
| 2017/0026769 A1* | 1/2017 | Patel | H04R 5/02 |
| 2018/0376242 A1* | 12/2018 | Nishidate | H04R 3/12 |

FOREIGN PATENT DOCUMENTS

JP 2018-157401 A 10/2018

* cited by examiner

*Primary Examiner* — Leon Viet Q Nguyen
(74) *Attorney, Agent, or Firm* — Chip Law Group

(57) ABSTRACT

An electronic apparatus and method for configuration of an audio reproduction system is provided. The electronic apparatus captures a set of stereo images of the listening environment and identifies a plurality of objects, including a display device and a plurality of audio devices, in the set of stereo images. The electronic apparatus estimates first location information of the plurality of audio devices and second location information of the display device. Based on first location information and the second location information, the electronic apparatus identifies a layout of the plurality of audio devices. The electronic apparatus receives an audio signal from each audio device and determines a distance between each audio device of the plurality of audio devices and a user location based on the received audio signal. The electronic apparatus determines an anomaly in connection of at least one audio device and generates connection information based on the determined anomaly.

24 Claims, 10 Drawing Sheets

CONFIGURATION OF AUDIO REPRODUCTION SYSTEM

CROSS-REFERENCE TO RELATED APPLICATIONS/INCORPORATION BY REFERENCE

None.

FIELD

Various embodiments of the disclosure relate to surround sound technology. More specifically, various embodiments of the disclosure relate to a system and method for connection and configuration of an audio reproduction system.

BACKGROUND

With advancements in surround sound technology, various configurations of multi-channel surround sound audio systems have gained popularity. Some of the configurations include, for example, 2.1 configuration, a 5.1 configuration, or a 7.1 configuration. Typically, a surround sound system may come with a setup manual or an automatic configuration option to configure the surround sound system(s) and achieve a required sound quality. Unfortunately, in many instances, settings determined for the surround sound system by use of the setup manual or the automatic configuration option may not always be accurate and may not even produce a suitable sound quality.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic apparatus and a method for configuration of an audio reproduction system is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed electronic apparatus and method for connection and configuration of an audio reproduction system. Exemplary aspects of the disclosure provide an electronic apparatus that may determine an anomaly in connection of audio devices of the audio reproduction system and generate connection or configuration information based on the determined anomaly to correct the anomaly and/or to calibrate the audio devices. The disclosed electronic apparatus relies on stereo images of the listening environment to identify different audio devices (e.g., Left, Right, center, surround left, surround right, etc.) with respect to a user in a wireless or a wired environment irrespective of a position of audio devices in the listening environment. The disclosed electronic apparatus also allows detection of wrong connection of audio devices to their Audio-Video Receiver (AVR) and missing connection of one or more audio devices to the AVR, without using a stereo microphone. In conventional solutions, the user is required to carry a stereo microphone wherever the user wants to calibrate the audio devices in the listening environment. Additionally, the disclosed electronic apparatus categorizes the listening environment into a specific type and also the objects in it using machine learning models, e.g., a pre-trained convolutional neural network (CNN). The disclosed electronic apparatus allows for creation of a room map, on which a user can tap to indicate his/her position to calibrate the audio devices to that position.

Figure 1:
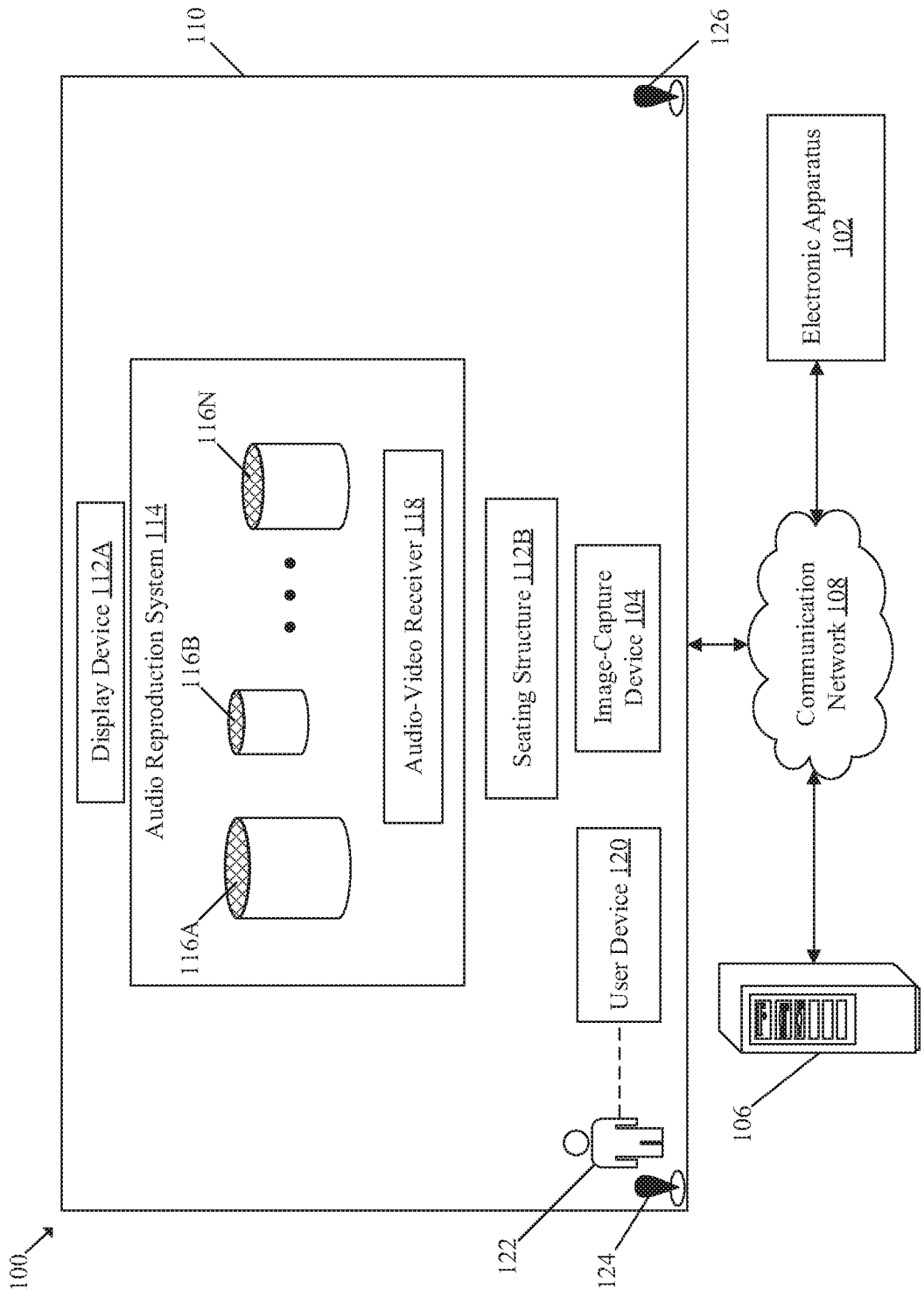
FIG. 1 is a diagram that illustrates an exemplary environment for configuration of an audio reproduction system, in accordance with an embodiment of the disclosure.

FIG. 1 is a diagram that illustrates an exemplary environment for configuration of an audio reproduction system, in accordance with an embodiment of the disclosure. With reference to FIG. 1, there is shown a network environment 100. The network environment 100 may include an electronic apparatus 102, an image-capture device 104, a server 106, and a communication network 108. The electronic apparatus 102 may be communicatively coupled to the server 106, via the communication network 108. In FIG. 1, the electronic apparatus 102 and the image-capture device 104 are shown as two separate devices; however, in some embodiments, the entire functionality of the image-capture device 104 may be incorporated in the electronic apparatus 102, without a deviation from scope of the disclosure. There is further shown a listening environment 110 which includes a display device 112A, a seating structure 112B, and an audio reproduction system 114. The audio reproduction system 114 may include a plurality of audio devices 116A, 116B . . . 116N.

There is further an Audio-Video Receiver (AVR) 118 and a user device 120 associated with a user 122. The AVR 118 may be a part of the audio reproduction system 114. In FIG. 1, the electronic apparatus 102 is shown outside the listening environment 110; however, in some embodiments, the electronic apparatus 102 may be inside the listening environment 110, without a deviation from scope of the disclosure.

The electronic apparatus 102 may comprise suitable logic, control circuitry, and interfaces that may be configured to determine an anomaly in connection of one or more audio devices of the plurality of audio devices 116A, 116B . . . 116N and generate connection information associated with the plurality of audio devices 116A, 116B . . . 116N based on the determined anomaly in the connection. Such connection information may be used to reconfigure or calibrate the audio reproduction system 114 and may include a plurality of fine-tuning parameters, such as, but not limited to, a delay parameter, a level parameter, an equalization (EQ) parameter, an audio device layout, room environment information, or the determined anomaly in the connection of the one or more audio devices. Examples of the electronic apparatus 102 may include, but are not limited to, a server, a media production system, a computer workstation, a mainframe computer, a handheld computer, a mobile phone, a smart appliance, and/or other computing device with image processing capability. In at least one embodiment, the electronic apparatus 102 may be a part of the audio reproduction system 114.

The image-capture device 104 may comprise suitable logic, control circuitry, and interfaces that may be configured to capture the set of stereo images of the listening environment 110. The set of stereo images may include a plurality of objects in a field-of-view (FOV) region of the image-capture device 104. In some embodiments, in addition to the image-capture device 104, a depth sensor may be used to capture a set of depth images corresponding to the set of stereo images of the listening environment 110. Examples of implementation of the image-capture device 104 may include, but are not limited to, an active pixel sensor, a passive pixel sensor, a stereo camera, a dual-camera setup, a smartphone, a digital camera, or a pair of cameras (s).

The server 106 may comprise suitable logic, control circuitry, and interfaces that may be configured to act as a store for the set of stereo images and a Machine Learning (ML) model (not shown). In some embodiments, the server 106 may be also responsible for training of the ML model and therefore, may be configured to store training data for the ML model. In certain instances, the server 106 may be implemented as a cloud server which may execute operations through web applications, cloud applications, HTTP requests, repository operations, file transfer, and the like. Other example implementations of the server 106 may include, but are not limited to, a database server, a file server, a web server, a media server, an application server, a mainframe server, or other types of servers.

In certain embodiments, the server 106 may be implemented as a plurality of distributed cloud-based resources by use of several technologies that are well known to those skilled in the art. A person with ordinary skill in the art will understand that the scope of the disclosure may not be limited to implementation of the server 106 and the electronic apparatus 102 as separate entities. Therefore, in certain embodiments, functionalities of the server 106 may be incorporated in its entirety or at least partially in the electronic apparatus 102, without a departure from the scope of the disclosure.

The communication network 108 may include a communication medium through which the electronic apparatus 102, the server 106, the display device 112A, the audio reproduction system 114, the user device 120, and/or certain objects in the listening environment 110 may communicate with each other. In some embodiments, the communication network 108 may include a communication medium through which the electronic apparatus 102, the image-capture device 104, the user device 120, and the audio reproduction system 114 may communicate with each other.

The communication network 108 may be a wired or wireless communication network. Examples of the communication network 108 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 108, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity(Li-Fi), 802.16, IEEE 802.11s, IEEE 802.11g, multi-hop communication, wireless access point (AP), device to device communication, cellular communication protocols, and Bluetooth (BT) communication protocols.

The listening environment 110 may be a built environment or a part of the built environment. The listening environment 110 may include a plurality of objects, for example, audio devices, display device(s), seating structure(s), and the like. Examples of listening environment 110 may include, but is not limited to, a living room, a listening room, a bedroom, a home theatre, a concert hall, a recording studio, an auditorium, a cinema hall, a gaming room, and a meeting room.

The display device 112A may comprise suitable logic, control circuitry, and interfaces that may be configured to display media content. The display device 112A may be placed (or mounted) on a wall in the listening environment 110. Alternatively, the display device 112A may be placed on (or affixed to) a support (for example, a table or a stand) in the listening environment 110. In certain embodiments, the display device 112A may be placed (or mounted) at the center of a wall and in front of the seating structure 112B in the listening environment 110. Example of the display device 112A, may be, but not limited to, a television, a display monitor, a digital signage, and/or other computing devices with a display screen.

The audio reproduction system 114 may comprise suitable logic, control circuitry, and interfaces that may be configured to control playback of audio content, via the plurality of audio devices 116A, 116B . . . 116N. The audio content may be, for example, a 3D audio, a surround sound audio, a positional audio, and the like. The audio reproduction system 114 may be any M:N surround sound system, where "M" may represent a number of speakers and "N" may represent a number of sub-woofers. Examples of the M:N surround sound system may include, but not limited to, 2:1 surround system, 3:1 surround system, 5:1 surround system, 7:1 surround system, 10:2 surround system, and 22:2 surround system. As an example, the audio reproduction system 114 may be a 5:1 surround system which includes 5 speakers, i.e., a center speaker, a left speaker, a right speaker, a surround left speaker, a surround right speaker and a subwoofer.

The plurality of audio devices 116A, 116B ... 116N include same or different types of speakers placed in accordance with a layout (e.g., a 5:1 layout) in the listening environment 110. The plurality of audio devices 116A, 116B ... 116N may be connected to the AVR 118, via a wired or a wireless connection. The placement of the plurality of audio devices 116A, 116B ... 116N may be based on a placement of certain objects, such as the display device 112A and/or a seating structure 112B (e.g., a sofa) in the listening environment 110.

The AVR 118 may comprise suitable logic, control circuitry, and interfaces that may be configured to drive the plurality of audio devices 116A, 116B ... 116N communicatively coupled to the AVR 118. Additionally, the AVR 118 may receive tuning parameters from the electronic apparatus 102 and configure each audio device of the plurality of audio devices 116A, 116B ... 116N based on the tuning parameters. Examples of the tuning parameters may include, but are not limited to, a delay parameter, a level parameter, and an EQ parameter. The AVR 118 may be, for example, an electronic driver of the audio reproduction system 114. Other examples of the AVR 118 may include, but are not limited to, a smartphone, a laptop, a tablet computing device, a wearable computing device, or any other portable computing device.

The user device 120 may comprise suitable logic, control circuitry, and interfaces that may be configured to record an audio signal from each audio device of the plurality of audio devices 116A, 116B ... 116N. The audio signal may of a specific duration (for example, "5 seconds"), a specific frequency, or a sound pattern. The user device 120 may be further configured to transmit the recorded audio signal to the electronic apparatus 102, via the communication network 108. Examples of the user device 120 may include, but are not limited to, a smartphone, a laptop, a tablet computing device, a wearable computing device, or any other computing device with audio recording capability.

In operation, an input may be provided to the electronic apparatus 102 as a request to calibrate the plurality of audio devices 116A, 116B ... 116N and/or reconfigure the plurality of audio devices 116A, 116B ... 116N based on tuning parameters for the plurality of audio devices 116A, 116B ... 116N. Additionally, or alternatively, the request may be for a detection of an anomaly in connection of one or more audio devices of the audio reproduction system 114. Such an input may be provided, for example, as a user input via the user device 120 and may be, for example, a result of a user's intention to improve a sound quality of the audio reproduction system 114, or to detect and correct the anomaly in the connection of one or more audio devices of the audio reproduction system 114.

By way of example, based on the input, the electronic apparatus 102 may be configured to communicate to the user device 120, a request for a set of stereo images (at least one stereo image) of the listening environment 110. The request may be an application instance which prompts the user 122 to upload the set of stereo images of the listening environment 110.

In at least one embodiment, the electronic apparatus 102 may be configured to control the image-capture device 104 to capture the set of stereo images of the listening environment 110. Alternatively, the set of stereo images may be captured by the image-capture device 104 based on a user input. The set of stereo images may include, for example, a first stereo image from a first viewpoint 124 and a second stereo image from the second viewpoint 126 of the listening environment 110.

The image-capture device 104 may be further configured to share the captured set of stereo images (such as the first stereo image and second stereo image) with the electronic apparatus 102. Alternatively, the captured set of stereo images may be shared with the server 106, via an application interface on the user device 120.

The electronic apparatus 102 may be configured to receive the captured set of stereo images. The received set of stereo images may include a plurality of objects, as present in the listening environment 110. For example, the plurality of objects may include the display device 112A, a seating structure 112B (for example a sofa, a chair, or a bed), and the plurality of audio devices 116A, 116B ... 116N of the audio reproduction system 114.

The electronic apparatus 102 may be further configured to identify the plurality of objects in the received set of stereo images. The plurality of objects may be identified based on application of the ML model (not shown) on the received set of stereo images. The electronic apparatus 102 may be further configured to determine a type of the listening environment 110 based on further application of an ML model on the identified plurality of objects. The type of listening environment may be, for example, a living room, a recording room, a concert hall, and the like. The ML model used for the determination of the type of the listening environment 110 may be same or different from that used for the identification of the plurality of objects. The ML model may be pre-trained on a training dataset of different object types typically present in any listening environment. Examples of the machine learning (ML) model may include, but is not limited to, a neural network model or a model based on one or more of regression method(s), instance-based method(s), regularization method(s), decision tree method(s), Bayesian method(s), clustering method(s), association rule learning, and dimensionality reduction method(s).

The electronic apparatus 102 may be further configured to estimate first location information of the plurality of audio devices 116A, 116B ... 116N based on the received set of stereo images. By way of example, the first location information may be estimated based on a set of computations which may be performed based on certain geometry models or mathematical relationships established among certain objects and/or reference locations in the listening environment 110. The details of the estimation of the first location information are described, for example, in FIGS. 3 and 6. The estimated first location information may include, for example, a 2D coordinate (x-y value) of each audio device of the plurality of audio devices 116A, 116B ... 116NA-114N, with respect to reference location(s) in the listening environment 110.

The electronic apparatus 102 may be further configured to estimate second location information of the display device 112A in the listening environment 110. The second location information may be estimated based on the estimated first location information of the plurality of audio devices 116A, 116B ... 116N. For example, it may be assumed that the display device 112A is placed exactly at the center and between two audio devices which are on same horizontal axis. In such instances, the second location information (e.g., a 2D coordinate value) may be estimated as a mean of locations of the two audio devices. The electronic apparatus 102 may be further configured to estimate third location information of a seating structure 112B in the listening environment 110. The third location information may be estimated based on, for example, a user location in case the user 122 is assumed to be seated on the seating structure 112B.

The electronic apparatus 102 may be further configured to identify a layout of the plurality of audio devices 116A, 116B . . . 116N in the listening environment 110 based on the estimated first location information of the plurality of audio devices 116A, 116B . . . 116N and the estimated second location information of the display device 112A. Additionally, or alternatively, the layout may be identified further based on the estimated third location information of the seating structure 112B. Such a layout may include, for example, a mapping between each audio device of the plurality of audio devices 116A, 116B . . . 116N and a respective positional-specific identifier for the corresponding audio device. As an example, if the layout is identified to be a 5:1 surround sound setup, the mapping may be given by a mapping table (Table 1), as follows:

TABLE 1

| Layout as a mapping between audio devices and positional identifier | |
|---|---|
| Audio Device | Positional Identifier |
| First audio device | Left Speaker |
| Second audio device | Right Speaker |
| Third audio device | Surround Left Speaker |
| Fourth audio device | Surround Right Speaker |
| Fifth audio device | Center Speaker |
| Sixth audio device | Subwoofer |

At any time instant, an audio signal from each audio device of the plurality of audio devices 116A, 116B . . . 116N may be recorded. Such an audio signal may include, for example, a test tone to be played by each audio device of the plurality of audio devices 116A, 116B . . . 116N. In certain embodiments, the user device 120 may include, for example, a mono-microphone to record the audio signal from each audio device of the plurality of audio devices 116A, 116B . . . 116N. The recorded audio signal from each audio device may be transmitted to the electronic apparatus 102, via the communication network 108.

The electronic apparatus 102 may be configured to receive the audio signal from each audio device of the plurality of audio devices 116A, 116B . . . 116N and based on the received audio signal, determine a distance between each audio device of the plurality of audio devices 116A, 116B . . . 116N and the user location in the listening environment 110. In some instances, the user 122 may connect certain audio devices to incorrect channels on the AVR 118, for example, a left speaker connected to a channel for a right speaker, or vice versa. In some other instances, the user 122 may forget to connect one or more audio devices to their respective channels on the AVR 118. In both instances, the audio quality of the audio reproduction system 114 may be affected and the user 122 may not like the listening experience from audio played by the audio reproduction system 114. Thus, based on the estimated first location information of the plurality of audio devices 116A, 116B . . . 116N, the layout identified for the plurality of audio devices 116A, 116B . . . 116N, and the determined distance between each audio device of the plurality of audio devices 116A, 116B . . . 116N and the user location, the electronic apparatus 102 may be configured to determine an anomaly in connection of one or more audio devices of the plurality of audio devices 116A, 116B . . . 116N. Such an anomaly may correspond to, for example, an incorrect connection or a missing connection of one or more audio devices with the AVR 118 of the audio reproduction system 114.

By way of example, the electronic apparatus 102 may be configured to estimate a Euclidean distance between the user location and a location value for each audio device of the plurality of audio devices 116A, 116B . . . 116N in the estimated first location information. For each audio device, the estimated Euclidean distance may be compared with the distance determined between the corresponding audio device and the user location based on the audio signal. In such instances, the anomaly in the connection may be determined based on whether the estimated Euclidean distance between the corresponding audio device and the user location is different from the distance determined between the corresponding audio device and the user location. By way of another example, from a specific audio device, no audio signal may be received. In such cases, it may not be possible to estimate the distance between the specific audio device and the user location based on the audio signal and the specific audio device may be classified as one of a disconnected or a malfunctioning device.

The electronic apparatus 102 may be further configured to generate connection information associated with the plurality of audio devices 116A, 116B . . . 116N based on the determined anomaly in connection of one or more audio device of the plurality of audio devices 116A, 116B . . . 116N. Such connection information may include, for example, instructions for the user 112 to correct the anomaly, messages which specify the anomaly, and location information of audio device(s) whose connections are found to be anomalistic. By way of example, the connection information may include information which details the anomaly and their respective solutions as a set of corrective measures to be followed by the user 122 to correct the anomaly.

The electronic apparatus 102 may be further configured to transmit the generated connection information to the user device 120. For example, the connection information may include a message, such as "The connection between a center audio device and the AVR is missing. Please connect the center audio device to the AVR." The user 122 may correct the connections based on the received connection information and therefore, enhance the listening experience of audio content played out by the audio reproduction system 114. Additionally, or alternatively, the electronic apparatus 102 may be configured to transmit the connection information to the AVR 118 so as to notify the audio reproduction system 114 about the anomaly in the connection of one or more audio devices.

In some embodiments, the electronic apparatus 102 may be further configured to generate configuration information for calibration of the plurality of audio devices 116A, 116B . . . 116N based on one or more of: the identified layout, the user location, the estimated first location information, and the generated connection information. The configuration information may include a plurality of fine-tuning parameters to enhance the listening experience of the user 122. The plurality of fine-tuning parameters may include, for example, a delay parameter, a level parameter, an EQ parameter, left/right audio device layout, room environment information, or the anomaly in the connection of the at least one audio device. The electronic apparatus 102 may be further configured to communicate the generated configuration information to the AVR 118 of the audio reproduction system 114. The AVR 118 may tune each audio device of the plurality of audio devices 116A, 116B ... 116N of the audio reproduction system 114 based on the received configuration information.

In some embodiments, a camera device (not shown) may be present in the listening environment 110. For example, the camera device may be integrated with the display device 112A. The camera device may be configured to capture the image of the listening environment 110. The camera device may be further configured to transmit the captured image of the listening environment 110 to the electronic apparatus 102. The electronic apparatus 102 may be configured to receive the captured images of the listening environment 110 from the camera device and may be further configured to determine a change in the user location relative to the layout of plurality of audio devices 116A, 116B . . . 116N of the audio reproduction system 114. The electronic apparatus 102 may determine the change in the user location relative to the layout of plurality of audio devices 116A, 116B . . . 116N based on the user detection in the received image. The electronic apparatus 102 may be further configured to generate an updated configuration information based in the updated user location received in the image of the listening environment 110. The electronic apparatus 102 may be further configured to communicate the generated updated configuration information to the AVR 118 of the audio reproduction system 114. The AVR 118 may tune each audio device of the plurality of audio devices 116A, 116B . . . 116N of the audio reproduction system 114 based on the received updated configuration information.

Figure 2:
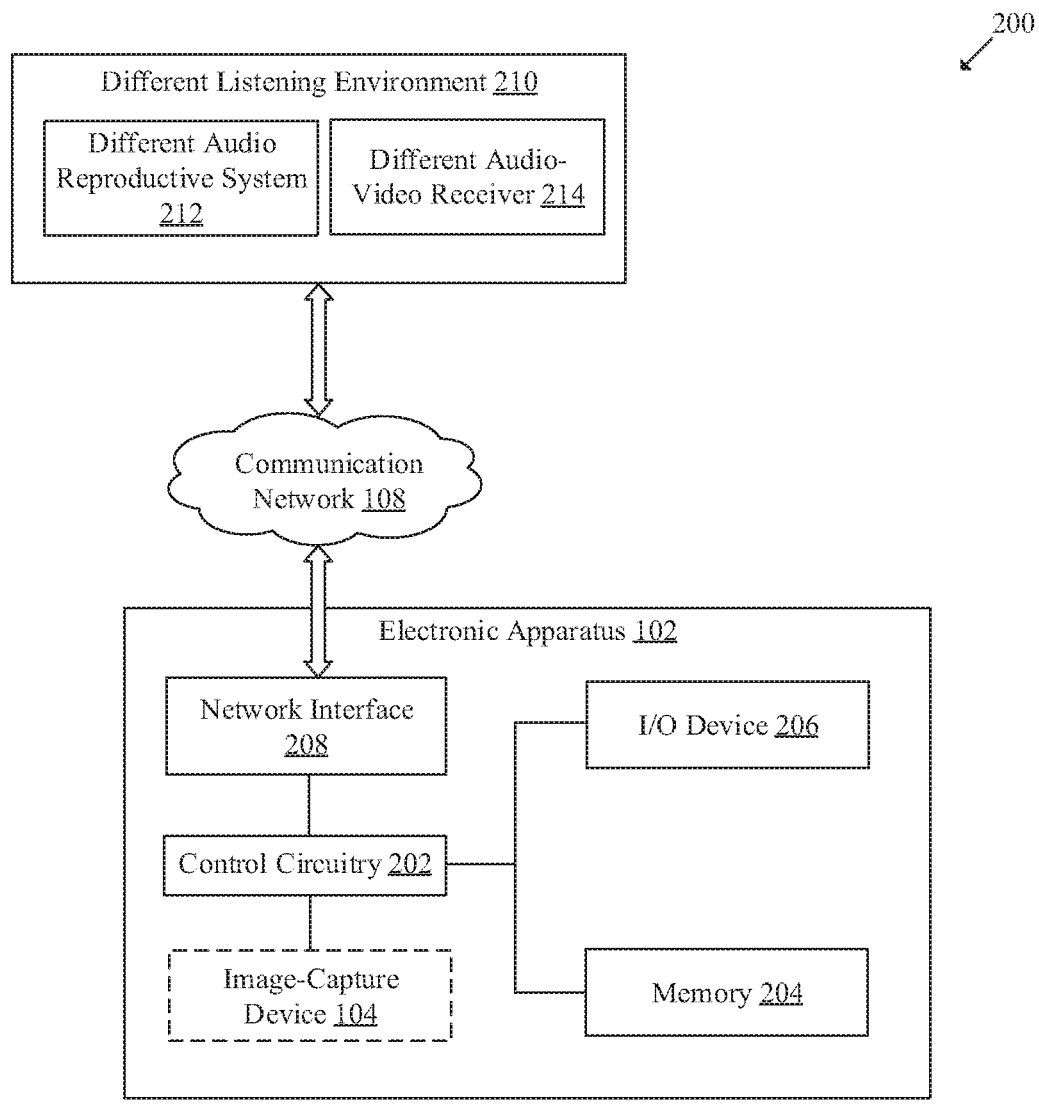
FIG. 2 is a block diagram that illustrates an exemplary electronic apparatus for configuration of an audio reproduction system, in accordance with an embodiment of the disclosure.

FIG. 2 is a block diagram that illustrates an exemplary electronic apparatus for configuration of an audio reproduction system, in accordance with an embodiment of the disclosure. FIG. 2 is explained in conjunction with elements from FIG. 1. With reference to FIG. 2, there is shown a block diagram 200 of the electronic apparatus 102. The electronic apparatus 102 may include control circuitry 202 which may perform operations for configuration of the audio reproduction system 114. The electronic apparatus 102 may further include a memory 204, an input/output (I/O) device 206, and a network interface 208. With reference to FIG. 2, there is further shown a different audio reproductive system 212 in a different listening environment 210. The different audio reproductive system 212 may be communicatively coupled to the electronic apparatus 102, via the communication network 108. In certain instances, the electronic apparatus 102 may incorporate the functionality of an imaging device present in the listening environment 110 and therefore, may include the image-capture device 104.

The control circuitry 202 may include suitable logic, control circuitry, and interfaces that may be configured to execute instructions stored in the memory 204. The executed instructions may correspond to, for example, at least a set of operations for determination of an anomaly in connection of one or more audio devices of the plurality of audio devices 116A, 116B . . . 116N. The control circuitry 202 may be implemented based on a number of processor technologies known in the art. Examples of the control circuitry 202 may include, but are not limited to, a Graphical Processing Unit (GPU), a co-processor, a Central Processing Unit (CPU), x86-based processor, a Reduced Instruction Set Computing (RISC) processor, an Application-Specific Integrated Circuit (ASIC) processor, a Complex Instruction Set Computing (CISC) processor, and a combination thereof.

The memory 204 may include suitable logic, control circuitry, and interfaces that may be configured to store the instructions to be executed by the control circuitry 202. Also, the memory may be configured to store a set of stereo images of the listening environment 110 and an ML model (pre-trained) for recognition of objects in the set of stereo images. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, control circuitry, and/or interfaces that may be configured to act as an I/O channel/interface between the user 122 and the electronic apparatus 102. The I/O device 206 may include various input and output devices which may communicate with different operational components of the electronic apparatus 102. Examples of the I/O device 206 may include, but are not limited to, a touch screen, a keyboard, a mouse, a joystick, a microphone, and a display screen.

The network interface 208 may include suitable logic, control circuitry, and/or interfaces that may be configured to facilitate communication between the electronic apparatus 102 and the server 106, via the communication network 108. The network interface 208 may be implemented by use of various known technologies to support wired or wireless communication of the electronic apparatus 102 with the communication network 108. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer control circuitry.

The network interface 208 may be configured to communicate via wireless communication with networks, such as the Internet, an Intranet or a wireless network, such as a cellular telephone network, a wireless local area network (LAN), or a metropolitan area network (MAN). The wireless communication may use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The different listening environment 210 may be also a built environment or a part of the built environment. The different listening environment 210 may include a plurality of objects, for example, audio devices, display device(s), seating structure(s), and the like. Examples of the different listening environment 210 may include, but is not limited to, a living room, a listening room, a bedroom, a home theatre, a concert hall, a recording studio, an auditorium, a cinema hall, a gaming room, and a meeting room.

The different audio reproduction system 212 may include suitable logic, control circuitry, and interfaces that may be configured to control playback of audio content, via a plurality of audio devices (not shown) in the different listening environment 210. The audio content may be, for example, a 3D audio, a surround sound audio, a positional audio, and the like. The different audio reproduction system 212 may be any M:N surround sound system, where "M" may represent a number of speakers and "N" may represent a number of sub-woofers. Examples of the M:N surround sound system may include, but not limited to, 2:1 surround system, 3:1 surround system, 5:1 surround system, 7:1 surround system, 10:2 surround system, and 22:2 surround system. As an example, the different audio reproduction system 212 may be a 5:1 surround system which includes 5 speakers, i.e., a center speaker, a left speaker, a right speaker, a surround left speaker, a surround right speaker and a subwoofer.

By way of example, and not limitation, the plurality of audio devices may include same or different types of speakers placed in accordance with a layout (e.g., a 5:1 layout) in the different listening environment 210. The plurality of audio devices may be connected to a different AVR 214, via a wired or a wireless connection. The placement of the plurality of audio devices may be based on a placement of certain objects, such as the display device and/or a seating structure (e.g., a sofa) in the different listening environment 210.

The different AVR 214 may include suitable logic, control circuitry, and interfaces that may be configured to drive the plurality of audio devices of the different audio reproductive system 212 communicatively coupled to the different AVR 214. Additionally, or alternatively, the different AVR 214 may receive tuning parameters from the electronic apparatus 102 and configure each audio device of the plurality of audio devices based on the tuning parameters. Examples of the tuning parameters may include, but are not limited to, a delay parameter, a level parameter, and an EQ parameter. The different AVR 214 may be, for example, an electronic driver of the different audio reproduction system 212. Other examples of the different AVR 214 may include, but are not limited to, a smartphone, a laptop, a tablet computing device, a wearable computing device, or any other portable computing device.

The functions or operations executed by the electronic apparatus 102, as described in FIG. 1, may be performed by the control circuitry 202. Operations executed by the control circuitry 202 are described in detail, for example, in the FIGS. 3, 4, 5A, 5B, 6, 7, 8, and 9.

Figure 3:
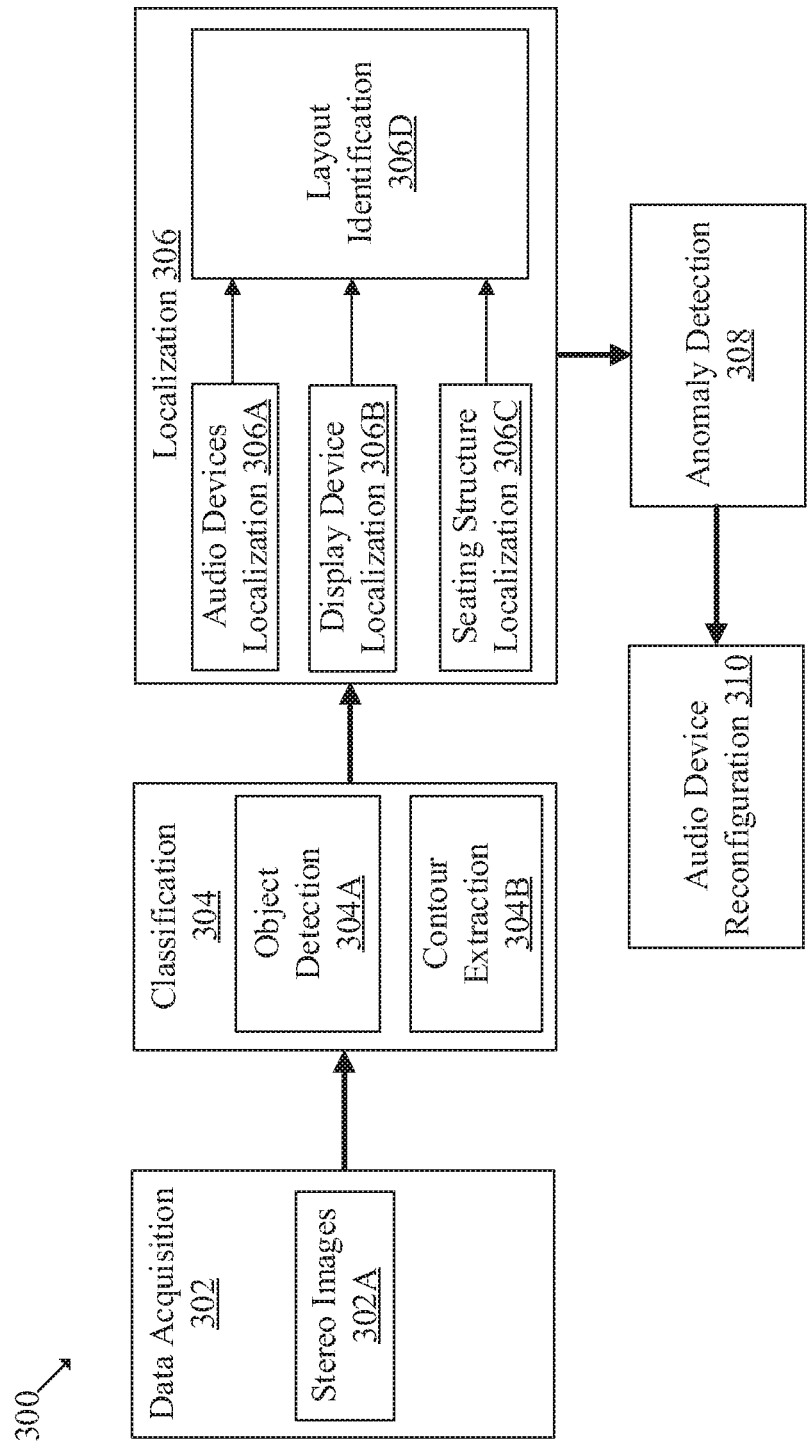
FIG. 3 is a diagram that illustrates exemplary operations for configuration of an audio reproduction system, in accordance with an embodiment of the disclosure.

FIG. 3 is a diagram that illustrates exemplary operations for configuration of audio reproduction system, in accordance with an embodiment of the disclosure. FIG. 3 is explained in conjunction with elements from FIG. 1 and FIG. 2. With reference to FIG. 3, there is shown a block diagram 300 of exemplary operations from 302 to 310.

At 302, a data acquisition operation may be executed. In the data acquisition operation, the control circuitry 202 may be configured to receive a set of stereo images 302A of the listening environment 110, which may include a plurality of objects, for example, audio device(s), display device(s), seating structure(s), and the like. In certain instances, the image-capture device 104 may be controlled by the control circuitry 202 to capture the set of stereo images 302A of the listening environment 110 and to share the captured set of stereo images 302A with the electronic apparatus 102. Alternatively, the user 122 may setup the image-capture device 104 at one or more reference locations in the listening environment 110 to capture the set of stereo images 302A and to share the set of stereo images 302A with the electronic apparatus 102. The set of stereo images 302A may be captured in such a way that each object of the plurality of objects in the listening environment 110 is captured in at least one of the set of stereo images 302A.

By way of example, the set of stereo images 302A may include a first stereo image and a second stereo image, which may be captured from the first viewpoint 124 and the second viewpoint 126, respectively, of the listening environment 110. The first and second viewpoints may be, for example, two corner spaces of a room which are appropriately spaced apart from each other and from the audio reproduction system 114 so as to allow the image-capture device 104 to capture certain objects (including the audio reproduction system 114) in the set of stereo images 302A. The number of stereo images may depend upon certain factors, such as, but not limited to, a size of the listening environment 110, a number of objects in the listening environment 110, a number of objects in that appear in the field of view from a single viewpoint.

At 304, a classification operation may be executed. The classification operation may include two sub-operations, i.e. object detection and contour extraction sub operations. At 304A, an object detection sub-operation may be executed. In the object detection sub-operation, the control circuitry 202 may be configured to detect and identify the plurality of objects in the set of stereo images 302A. Such an identification may be performed based on the application of an ML model on the received set of stereo images 302A. The ML model may be a model that is trained with the help of a training set to be able to detect and identify different objects present in a stereo image. By way of example, the ML model may be a trained Convolutional Neural Network (CNN), or a variant thereof. The ML model may output a likelihood for a detected object in a given stereo image. Such likelihood may be indicative of a specific class label (or an object class) for the detected object, for example, a speaker or a display. Additionally, in some embodiments, the control circuitry 202 may be configured to determine a type of listening environment based on the identification of the plurality of objects in the listening environment 110. Examples of the type of listening environment may include, but is not limited to, a living room, a bedroom, a concert hall, an auditorium, a stadium, or a recording studio. By way of example, in instances where the identified plurality of objects in the listening environment 110 includes a display device 112A, one or more windows, a sofa, and a group of speakers placed around the sofa and the display device 112A, the type of listening environment may be determined as a living room.

At 304B, a contour extraction sub-operation may be executed. In the contour extraction sub-operation, the control circuitry 202 may be configured to extract a plurality of contours corresponding to the display device 112A, the seating structure 112B, and the plurality of audio devices 116A, 116B . . . 116N. The plurality of contours may be extracted based on the set of stereo images 302A. In general, the contour of an object in a stereo image may represent a boundary or an outline of the object and may be used to localize the object in the stereo image.

The control circuitry 202 may be further configured to output a layout map for the listening environment 110 based on the extracted plurality of contours. The layout map may be indicative of relative placement of the display device 112A, the seating structure 112B, and the plurality of audio devices 116A, 116B . . . 116N in the listening environment 110. It may be assumed that once the set of stereo images 302A is captured, the relative placement of the plurality of objects in the listening environment 110 remains the same.

In certain embodiments, the control circuitry 202 may be further configured to output the layout map on the user device 120 or the display device 112A and receive a user input on the layout map. Such a user input may be a touch input, a gaze-based input, a gesture input, or any other input known in the art and may indicate the user location in the listening environment 110. In such instances, the control circuitry 202 may be configured to determine the user location in the listening environment 110 based on the received user input. As an example, the user 122 may touch the sofa on the output layout map to pinpoint the user location.

At 306, a localization operation may be executed. In the localization operation, the control circuitry 202 may be responsible for localization of the plurality of audio devices 116A, 116B . . . 116N, the display device 112A, and the seating structure 112B. Additionally, the control circuitry 202 may be responsible for identification of a layout of the plurality of audio devices 116A, 116B . . . 116N in the listening environment 110.

Initially, the control circuitry 202 may be configured to determine a first reference location at which the image-capture device 104 captures the first stereo image. The first reference location may be defined by a location co-ordinate at which the image-capture device 104 captures the first stereo image. By way of example, the location co-ordinate may be determined based on Global Navigation Satellite System (GNSS) information of a GNSS receiver in the image-capture device 104. Such GNSS information may be part of metadata associated with the first stereo image. Alternatively, the location co-ordinate may be determined to be an origin (i.e. 0, 0, and 0) for the listening environment 110 and may be either preset for the listening environment 110 or user-defined. In such a case, the location of all objects in the listening environment 110 may be estimated relative to the first reference location as the origin. For example, the user 122 may be instructed to setup the image-capture device 104 at the extreme left hand side corner of the listening environment 110 and close to a wall facing opposite to that for the display device 112A.

The control circuitry 202 may be further configured to determine a second reference location at which the image-capture device 104 captures the second stereo image. The second reference location may be determined based on the GNSS information of the image-capture device 104. Alternatively, the second reference location may be determined based on certain preset conditions, such as, a condition that both the first reference location and the second reference location lie on a common horizontal line. For example, if the first reference location is (0, 0) and a distance between the first reference location and the second reference location is "d", then the second reference location (assuming the first reference location to be on the common horizontal line) is determined as (d, 0). The determination of the second reference location is described in detail, for example, in FIG. 5B.

At 306A, an operation for localization of the plurality of audio devices 116A, 116B . . . 116N may be executed. In the operation, the control circuitry 202 may be configured to compute an in-image location of the each audio device of the plurality of audio devices 116A, 116B . . . 116N in the listening environment 110. By way of example, an in-image location of a point in an image with a 2D coordinate value (d) along with a depth component (z) measured with respect to an image place (P) of the image-capture device 104. In order to compute the in-image location for each audio device of the plurality of audio devices 116A, 116B . . . 116N, the control circuitry 202 may be configured to compute a disparity-measure of pixel information from the set of stereo images 302A. By way of example, the disparity-measure of pixel information may be computed from the first stereo image or the second stereo image. The disparity-measure of pixel information may correspond to difference in pixel position between two camera images of a stereo image, for example, a left camera image and a right camera image of the stereo image. For the sake of simplicity, it may be assumed that the image-capture device 104 is a stereo camera which may have two or more lenses or cameras, such as a left lens (or a camera (L)) and a right lens (or camera (R)). The computation of disparity-measure of pixel information is described in detail, for example in FIG. 5A.

The control circuitry 202 may be further configured to calculate a first distance value between the computed in-image location of each audio device of the plurality of audio devices 116A, 116B . . . 116N and the determined first reference location. Additionally, or alternatively, the first distance value may be also calculated between the computed in-image location of each audio device of the plurality of audio devices 116A, 116B . . . 116N and the determined second reference location. Similarly, the control circuitry 202 may be further configured to calculate a second distance value between a pair of audio devices of the plurality of audio devices 116A, 116B . . . 116N based on the calculated first distance value.

By way of example, a living room may include a 5:1 surround sound setup, which includes a group of 5 speakers (e.g., a left speaker (LS), a right speaker (RS), a center speaker (CS), a left surround speaker (LSR), and a right surround speaker (RSS) and 1 sub-woofer (SW). The living room may include two reference locations at two corners of the living room. At first, a first distance value between each speaker of the 5:1 surround sound setup and one or more of the two reference locations may be calculated. Further, a second distance value between different pairs of speakers (i.e., LS-RS, LS-CS, RS-CS, LS-LSR, LS-RSS, CS-LSR, and CS-RSS) may be calculated.

Additionally, or alternatively, the control circuitry 202 may be further configured to calculate a third distance value between the determined first reference location and the determined second reference location based on the calculated first distance value and the calculated second distance value. The calculation of the first distance value, the second distance value and the third distance value is described in detail, for example, in FIG. 5B.

Additionally, or alternatively, the control circuitry 202 may be further configured to estimate angle information with respect to a reference axis for the plurality of audio devices 116A, 116B . . . 116N. The reference axis may be, for example, an axis orthogonal to the line that joins the first reference location and the second reference location. Such an estimate of the angle information may be based on the calculated first distance value and one of the calculated second distance value or the calculated third distance value. The angle information may indicate a specific direction in which each corresponding audio device of the plurality of audio devices 116A, 116B . . . 116N is located in the listening environment 110 with respect to the reference axis. The estimation of angle information is described in detail, for example, in FIG. 5B.

The control circuitry 202 may be further configured to estimate the first location information of the plurality of audio devices 116A, 116B . . . 116N in the listening environment 110 based on the estimated angle information and the calculated first distance value. The first location information may refer to the actual co-ordinates of the each audio device of the plurality of audio devices 116A, 116B . . . 116N, measured with respect to the first reference location of the listening environment 110.

At 306B, an operation for localization of the display device 112A may be executed. In the operation, the control circuitry 202 may be configured to estimate second location information of the display device 112A in the listening environment 110. The second location information may be estimated based on the disparity-measure of pixel information for the display device 112A from the set of stereo images 302A. The disparity-measure of the pixel information may be further used to determine actual co-ordinates of the display device 112A in the listening environment 110, with respect to the first reference location. Alternatively, in some embodiments, the location of the display device 112A may be approximated to be somewhere between a pair of left and right audio devices of the audio reproduction system 114. For example, the display device 112A may be between the left speaker (LS) and the right speaker (RS) of the 5:1 surround sound setup, more specifically, to be at the midpoint of a line segment which has the pair of left and right audio devices at its two endpoints. In such a case, the second location information may be the location of the midpoint which may be, for example, an average of the locations of the pair of left and right audio devices.

At 306C, an operation for localization of the seating structure 112B may be executed. In the operation, the control circuitry 202 may be configured to estimate third location information of the seating structure 112B in the listening environment 110. The third location information may be estimated, for example, by using disparity-measure of pixel information for the seating structure 112B from the set of stereo images 302A. The disparity-measure of the pixel information may be further used to determine actual co-ordinates of the seating structure 112B in the listening environment 110, with respect to the first reference location. Alternatively, in some embodiments, the location of the seating structure 112B may be approximated to be somewhere between a pair of left and right surround audio devices of the audio reproduction system 114. For example, the seating structure 112B may be between a left surround speaker (LSR) and a right surround speaker (RSS) of the 5:1 surround sound setup. The control circuitry 202 may be configured to calculate a location of the mid-point of a line segment which has the pair of left and right surround audio devices at its two endpoints. The second location information may be the location of the midpoint which may be, for example, an average of the locations of the pair of left and right surround audio devices.

At 306D, an operation may be executed for identification of a layout of the plurality of audio devices 116A, 116B . . . 116N. In the operation, the control circuitry 202 may be configured to identify a layout of the plurality of audio devices 116A, 116B . . . 116N in the listening environment 110 based on the estimated first location information of the plurality of audio devices 116A, 116B . . . 116N and the estimated second location information of the display device 112A. Additionally, in certain instances, the layout of the plurality of audio devices 116A, 116B . . . 116N may be identified further based on the estimated third location information of the seating structure 112B.

By way of example, in order to identify the layout of the plurality of audio devices 116A, 116B . . . 116N, locations of the display device 112A and the seating structure 112B may be taken as a reference to assign a position-specific identifier of a defined layout to each audio device of the plurality of audio devices 116A, 116B . . . 116N. For example, two audio devices placed symmetrically to the left and the right of the display device 112A may be identified as left and right speakers. Whereas, another pair of audio devices placed symmetrically to the left and right of the seating structure 112B may be identified as left and right surround sound speakers. Similarly, another audio device placed right in front of the display device 112A may be identified as a center speaker. In case of identification of the left and right speakers, the left and right surround sound speakers, and the center speaker, the layout may be identified as a 5:1 surround sound layout.

At 308, an anomaly detection operation may be executed. In the anomaly detection operation, the control circuitry 202 may be configured to determine an anomaly in the connection of one or more audio devices of the plurality of audio devices 116A, 116B . . . 116N in the listening environment 110. Operations for the determination of the anomaly are described herein. At first, the control circuitry 202 may be configured to receive the user location in the listening environment 110. The user location may correspond to GPS co-ordinates of the user device 120 associated with the user 122. Alternatively, the user location may be based on a user input (as mentioned at 304) from the user 122. Alternatively, it may be assumed that the user 122 is seated on the seating structure 112B and therefore, the user location may be identified to be same as the estimated third location information of the seating structure 112B.

At a certain time instant, an audio file may be provided to the plurality of audio channels of the plurality of audio devices 116A, 116B . . . 116N and audio signal(s) from the plurality of audio devices 116A, 116B . . . 116N may be recorded via a microphone, for example, a mono-microphone associated the user device 120. The audio signal may be recorded from each of or at least one of the plurality of audio devices 116A, 116B . . . 116N up to a defined time period (say 5 seconds). The recorded audio signal(s) from the plurality of audio devices 116A, 116B . . . 116N may be transmitted to the electronic apparatus 102. The control circuitry 202 may be configured to receive the audio signals(s) from the plurality of audio devices 116A, 116B . . . 116N. Based on the received audio signal, the control circuitry 202 may be configured to determine a distance between the user location and each audio device of the plurality of audio devices 116A, 116B . . . 116N in the listening environment 110. As an example, the distance may be determined based on Time-of-Arrival (TOA) measurements of the audio signal for each of the plurality of audio devices 116A, 116B . . . 116N. A TOA measurement may include the time taken by the audio signal to reach the microphone from an audio device as soon as the audio device is activated to play a sound to generate the audio signal. Based on the speed of sound and the time, a distance measurement between the microphone (i.e. assumed user location) and the audio device may be determined.

The control circuitry 202 may be further configured to estimate a Euclidean distance between the user location and a location value for each audio device of the plurality of audio devices 116A, 116B . . . 116N. The location value of each audio device of the plurality of audio devices 116A, 116B . . . 116N may be specified in the first location information (estimated at 304A). The estimation of Euclidean distance is described in detail, for example, in FIGS. 3 and 7.

For each audio device of the plurality of audio devices 116A, 116B . . . 116N, the control circuitry 202 may be configured to compare the estimated Euclidean distance with the distance based on the audio signal(s). The determination of the anomaly in the connection of one or more audio devices may be based on the comparison of the estimated Euclidean distance with the determined distance. As an example, a speaker (S) may be placed to the left of the display device 112A and its connection may be incorrectly made to the right speaker channel (i.e. reserved for a right speaker). As the audio signal provided to the right speaker channel may be played by the speaker (S), the distance measurement based on the audio signal may not match with the Euclidean distance measurement between the user location and a location (at 304) of a left speaker identified in the stereo image. This may be helpful to determine whether the speaker (S) is correctly connected to the left speaker channel as per its location in the listening environment 110 and the identified layout. The determination of the anomaly is further described in detail, for example, in FIG. 7.

By way of example, the anomaly in connection may correspond to an incorrect connection or a missing connection of one or more audio devices with the AVR 118. The missing connection may correspond to a connection which has not been established between the AVR 118 and an audio device of the audio reproduction system 114. As an example, an incorrect connection may be based on a determination that a speaker kept on the right side of the display device 112A is connected to a left output port of the AVR 118. In instances where a speaker is not connected to any audio port on the AVR 118, the connection of the speaker may be marked as a missing connection.

At 310, a reconfiguration operation may be executed. In the reconfiguration operation, the control circuitry 202 may be configured to generate connection information associated with the plurality of audio devices 116A, 116B . . . 116N based on the determined anomaly in the connection of one or more audio devices. The generated connection information may be shared with the user device 120, via the communication network 108. The connection information may include, for example, a connection status of each audio device marked in the identified layout, a type of anomaly associated with each audio device, and/or a current quality-measure of the audio reproduction system 114. The connection information may also include, for example, instructions for the user 122 to establish a connection between an audio device and the AVR 118 and rectify the incorrect connection or the missing connection. Additionally, or alternatively, in some embodiments, the control circuitry 202 may be configured to transmit the connection information to the AVR 118. The AVR 118 may receive the connection information and attempt to establish the missing connection or to correct the incorrect connection based on the received connection information.

The control circuitry 202 may be configured to generate configuration information for calibration of the plurality of audio devices 116A, 116B . . . 116N. The configuration information may be generated based on the identified layout, the user location, the estimated first location information of the plurality of audio devices 116A, 116B . . . 116N, and the connection information of the plurality of audio devices 116A, 116B . . . 116N. The generated configuration information may be shared with the AVR 118 of the audio reproduction system 114 and may include a plurality of fine-tuning parameters for at least one audio device of the plurality of audio devices 116A, 116B . . . 116N. The AVR 118 may receive the configuration information for the plurality of audio devices 116A, 116B . . . 116N and may calibrate each audio device of the plurality of audio devices 116A, 116B . . . 116N based on the plurality of fine-tuning parameters.

In some embodiments, there may be multiple listening environments such as the listening environment 110 and the different listening environment 210. The different listening environment 210 may also have the same layout or a different layout of audio devices as the listening environment 110. Additionally, in certain instances, the number and position of objects in the different listening environment 210 may be same as that for the listening environment 110. At a time-instant, the user may change his/her position from the listening environment 110 to the different listening environment 210. The different listening environment 210 may include the different audio reproduction system 212. In order to ensure that the user gets the same audio listening experience in the different listening environment 210, the control circuitry 202 may detect a change in the user location from the listening environment 110 to the different listening environment 210 and may share the configuration information generated for the audio reproductive system 114 with the different audio reproductive system 212. In some embodiments, the AVR 118 may be configured to share the configuration information generated for the audio reproductive system 114 with the different AVR 214 in the different listening environment 210. The control circuitry 202 may be further configured to configure the different audio reproduction system 212 in the different listening environment 210 based on the shared configuration information. Alternatively, in some embodiments, the different AVR 214 may configure the different audio reproduction system 212 in the different listening environment 210 based on the shared configuration information.

It should be noted that operations of data acquisition at 302, classification at 304 and localization at 306 may be a one-time operation that may occur during an initial setup of the audio reproduction system 114. These operations may have to be repeated when the location of at least one audio device changes in listening environment 110. Whereas, for example, the reconfiguration at 310 may be performed every time the user 122 enters the listening environment 110.

Figure 4:
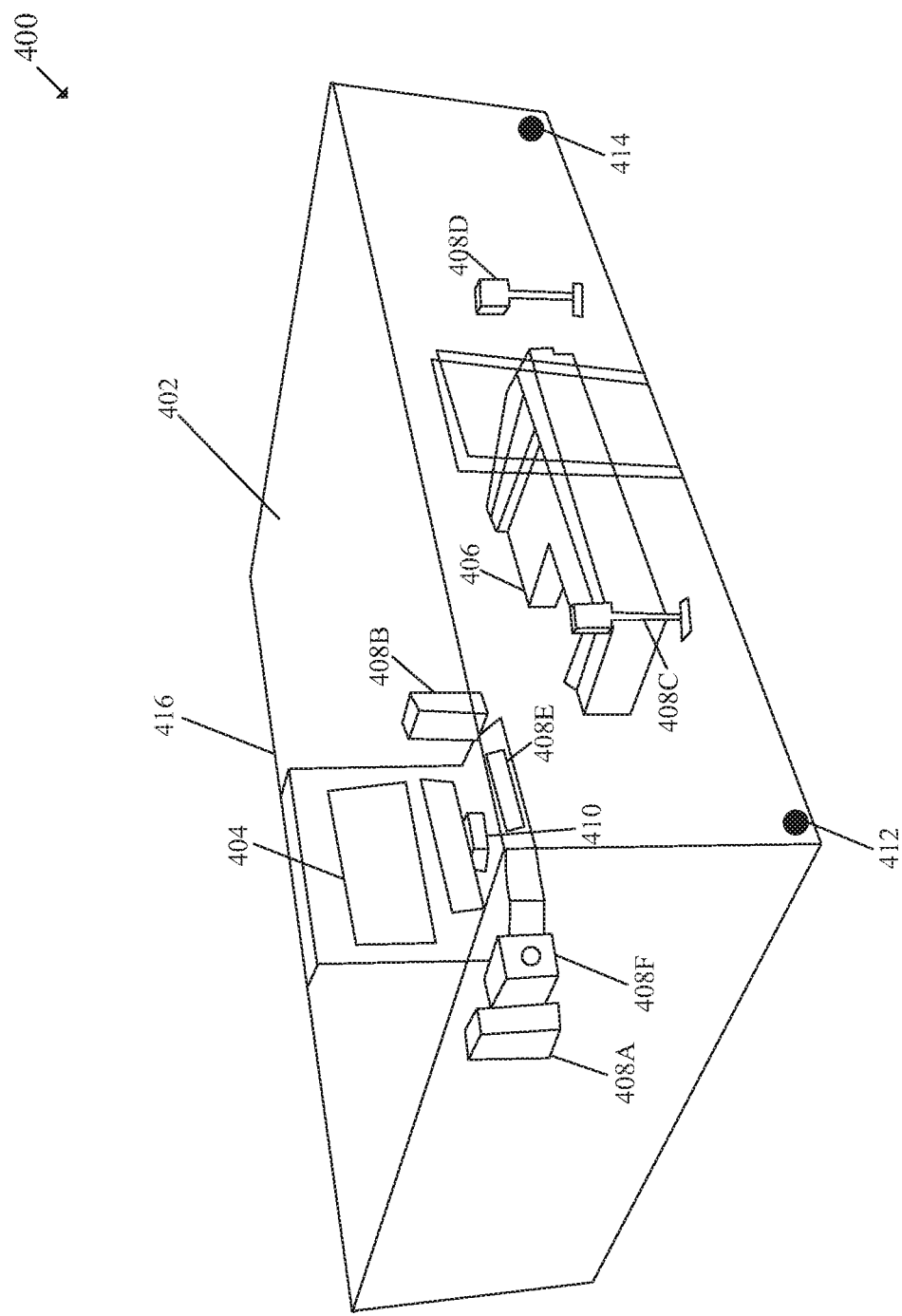
FIG. 4 is a diagram that illustrates a view of an example layout of objects in an example listening environment, in accordance with an embodiment of the disclosure.

FIG. 4 is a diagram that illustrates a view of an example layout of objects in an example listening environment, in accordance with an embodiment of the disclosure. FIG. 4 is explained in conjunction with elements from FIG. 1, FIG. 2, and FIG. 3. With reference to FIG. 4, there is shown a view 400 of an example layout of objects in an example listening environment 402 (hereinafter, "listening environment 402"). The listening environment 402 may include a plurality of objects, such as a display device 404, a seating structure 406, and an audio reproduction system. The audio reproduction system may be a 5:1 surround system, which includes a first audio device 408A, a second audio device 408B, a third audio device 408C, a fourth audio device 408D, a fifth audio device 408E, a subwoofer 408F and an AVR 410. In FIG. 4, there is further shown a first viewpoint 412 and a second viewpoint 414, both of which may be assumed to be on a common horizontal line.

The display device 404 may be placed on a wall 416 at the center, for example. The seating structure 406 may be at the center of the listening environment 402. The placement of the first audio device 408A, the second audio device 408B, the third audio device 408C, the fourth audio device 408D, the fifth audio device 408E may be with respect to the display device 404 and the seating structure 406. The first audio device 408A may be placed to the left of the display device 404 and may be referred to as a left speaker. Similarly, the second audio device 408B may be placed to the right of the display device 404 and may be referred to as a right speaker. In some embodiments, the first audio device 408A and the second audio device 408B may be spaced apart by equal distance from the display device 404. Additionally, it may be assumed that the first audio device 408A, the second audio device 408B, and the display device 404 lie on a common horizontal line. Also, in some instances, it may be further assumed that the display device 404 is placed at the midpoint of the common horizontal line, with first audio device 408A and the second audio device 408B at two endpoints of the common horizontal line.

The third audio device 408C may be placed behind the seating structure 406 and to left of the seating structure 406 and may be referred to as a surround left speaker. The fourth audio device 408D may be placed behind the seating structure 406 and to the right of the seating structure 406 and may be referred to as a surround right speaker. The fifth audio device 408E may be placed directly above or below the display device 404 and may be referred to as a center speaker. The subwoofer 408F and the AVR 410 may be placed anywhere in the listening environment 402, according to convenience of the user 122.

Figure 5A:
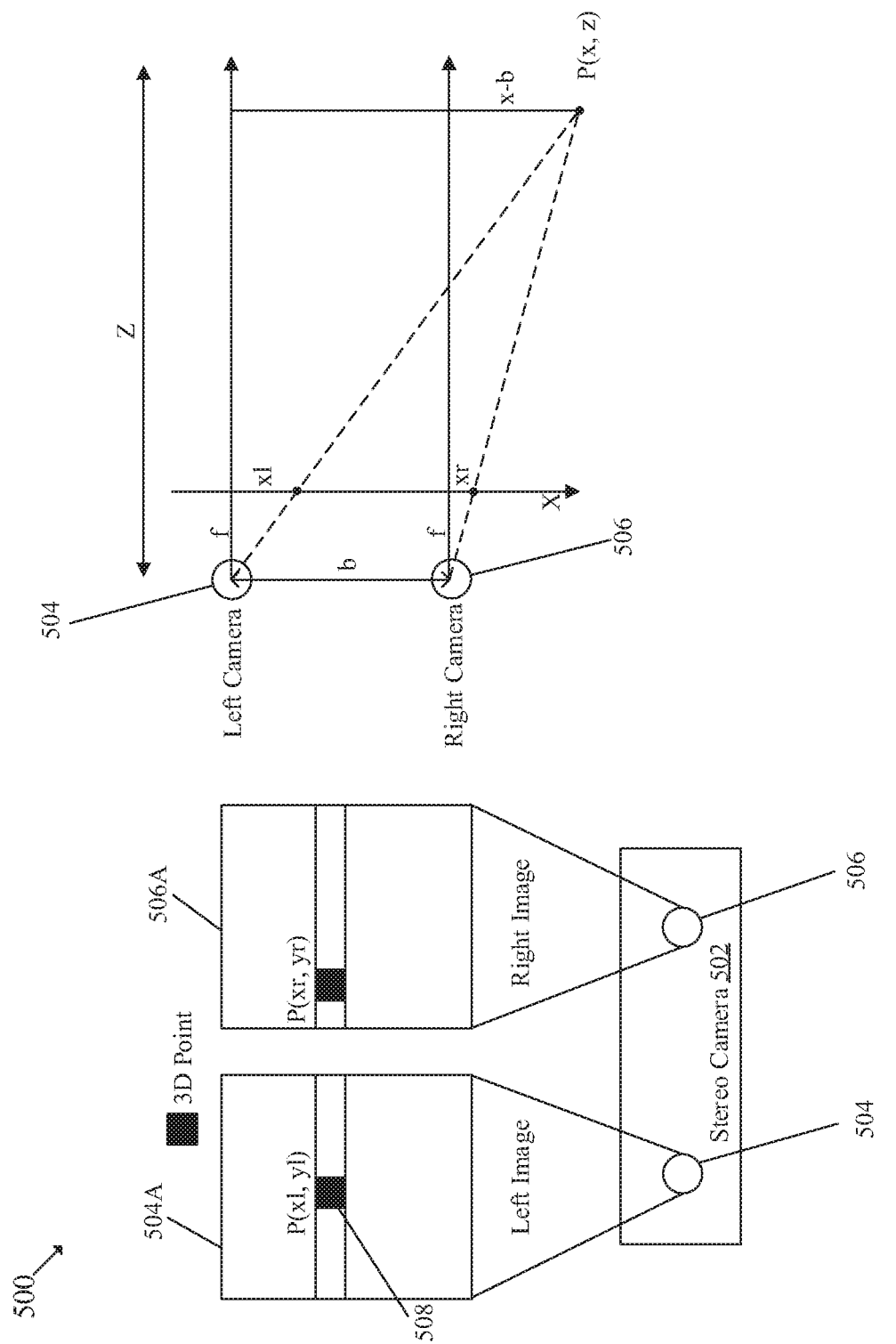
FIG. 5A is a diagram that illustrates exemplary computation of a disparity-measure using a stereo camera, in accordance with an embodiment of the disclosure.

FIG. 5A is a diagram that illustrates exemplary computation of a disparity-measure using a stereo camera, in accordance with an embodiment of the disclosure. FIG. 5A is explained in conjunction with elements from FIGS. 1, 2, 3, and 4. With reference to FIG. 5, there is shown an example diagram 500 for computation of a disparity-measure using a stereo camera 502.

The stereo camera 502 may include a left camera 504 and a right camera 506. The left camera 504 and the right camera 506 may be separated by a distance "b", referred to as a baseline. The left camera 504 and the right camera 506 may have same focal length "f" and may capture a left image 504A of a 3D point "P" and the right camera may capture right image 506A of the same point "P". Herein, the point "P" may be defined by x, y, z co-ordinates. It may be assumed that both the left camera 504 and the right camera 506 have an optical axis parallel to one another. The position of point "P" on the left image may be denoted by (xl, yl) and the position of the point "P" on the right image may be denoted by (xr, yr). The disparity-measure "d" may correspond to a distance between two corresponding points (such as, Point "P") in the left image 504A and right image 506A. The depth of Point "P" with respect to an image plane of the left camera 504 and the right camera 506 may be denoted by "z".

Using properties of similar triangles, equations (1), (2), and (3) may be derived as follows:

$$\frac{Z}{f} = \frac{x}{xl} \qquad (1)$$

$$\frac{Z}{f} = \frac{x-b}{xr} \qquad (2)$$

$$\frac{Z}{f} = \frac{y}{yl} = \frac{y}{yr} \qquad (3)$$

From equations (1), (2), and (3), equations (4), (5), and (6) for computation of the coordinates of the point "P" may be obtained, as follows:

$$z = \frac{f \times b}{(xl - xr)} = \frac{f \times b}{d} \qquad (4)$$

$$x = \frac{xl \times z}{f} = b + \frac{xr \times z}{f} \qquad (5)$$

$$y = \frac{yl \times z}{f} = \frac{yr \times z}{f} \qquad (6)$$

Using equations (4), (5), and (6), an in-image location of each audio device of the plurality of audio devices 408A, 408B, 408C, 408D, 408E, and 408F may be computed.

Figure 5B:
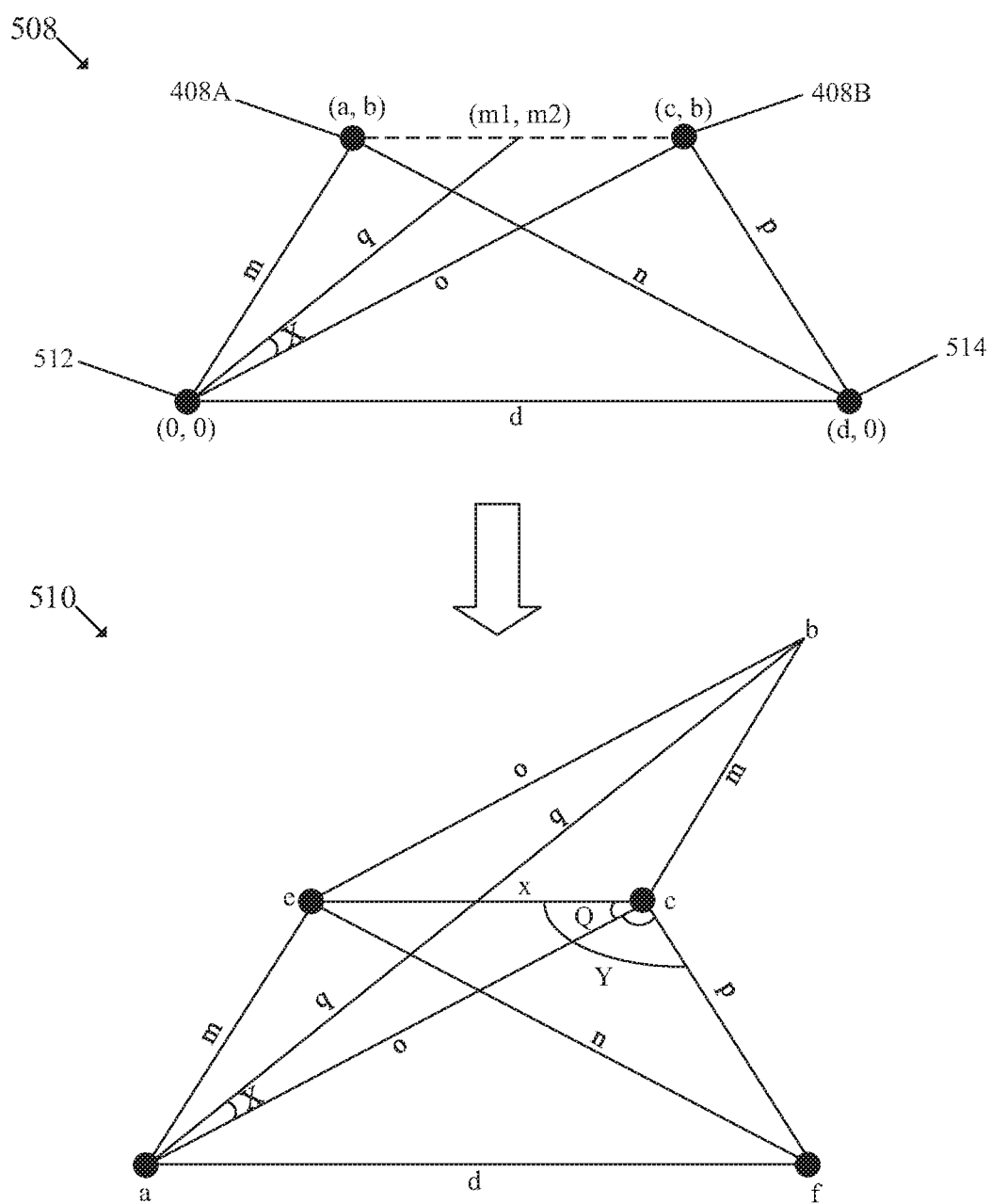
FIG. 5B is a diagram that illustrates exemplary distances calculations, in accordance with an embodiment of the disclosure.

FIG. 5B is a diagram that illustrates exemplary distances calculations, in accordance with an embodiment of the disclosure. FIG. 5B is explained in conjunction with elements from FIGS. 1, 2, 3, 4, and 5A. With reference to FIG. 5B, there is shown a first diagram 508 and a second diagram 510, which is a modification of the first diagram 508 for calculation of distance values. For the sake of brevity, we have limited our calculations to two audio devices (i.e. the first audio device 408A (the left speaker) and the second audio device 408B (the right speaker). Therefore, the first diagram 508 and the second diagram 510 may be construed for calculations of distance values related to the first audio device 408A and the second audio device 408B.

From equations (4), (5), and (6), the in-image location of each audio device may be calculated. The calculated in-image location of the first audio device 408A may be given by (a, b) and the calculated in-image location of the second audio device 408B may be given by (c, b). The mid-point of a line joining (a, b) and (c, b), i.e. the first audio device 408A and the second audio device 408B may be denoted by "M", with co-ordinates (m1, m2). A first reference location 512 at which the image-capture device 104 captures the first stereo image may be selected as (0, 0) and a second reference location 514 at which the image-capture device 104 captures the second stereo image may be determined as (d, 0), where the distance between the first reference location 512 and the second reference location 514 may be given by "d". The distance between the first reference location 512 and the first audio device 408A may be denoted by "m". The distance between the first reference location 512 and the second audio device 408B may be denoted by "o". The distance between the first reference location 512 and the mid-point "M" may be denoted by "q." and the distance between the second reference location 514 and the first audio device 408A may be denoted by "n". The distance between the second reference location 514 and the second audio device 408B may be denoted by "p". Since "M" is the mid-point of the first audio device 408A at (a, b) and the second audio device 408B at (c, b). The value for "m1" and "m2" may be calculated using equations (7) and (8), as follows:

$$m1 = \frac{a+c}{2} \qquad (7)$$

$$m2 = \frac{b+b}{2} \qquad (8)$$

The first reference location 512 at which the image-capture device 104 captures the first stereo image may represented by "a" and the second reference location 514 at which the image-capture device 104 captures the second stereo image may represented by "f". The in-image location of the first audio device 408A may be represented by "e" and the in-image location of the second audio device 408B may be represented by "c". The distance "q" between the first reference location 512 and the mid-point "M" may be extended up to "b". The distance between "b" and "e" may be denoted by "o", while the distance between "b" and "c" may be denoted by "m" and the distance between "e" and "c" may be denoted by "x". The angle between the "o" and "q" may be denoted by "X" The angle between "x" and "o" may be denoted by "Q" and the angle between the "o" and "p" may be denoted by "D". The angle between the "x" and "p" may be denoted by "Y". The control circuitry 202 may be configured to calculate first distance values (i.e. "m", "n", "o", "p", and "q") between each computed in-image location (e or c) and one of the first reference location 512 or the second reference location 514. The first distance values (i.e. "m", "n", "o", "p", and "q") may be calculated using equations (4), (5), and (6) for disparity-measure.

The control circuitry 202 may be further configured to calculate a second distance value (i.e. "x"), a third distance value (i.e. "d"), and angle information (i.e. values of "∠X", "∠Q", and "∠Y"). By way of example, the cosine rule may be applied to calculate the first distance, the second distance, the third distance, and the angle information. Consider ΔABC with a side length of AB=c, BC=a, and AC=b with ∠A between AB and AC, ∠C between BC and AC, and ∠A between AB and BC. The cosine rule may be given by equation (9), as follows:

$$a^2 = b^2 + c^2 31\ 2bc \cdot \cos(A) \quad (9)$$

Based on equation (9), the second distance value (i.e. "x") may be calculated using equation (10), as follows:

$$x = 2 \times \sqrt{(o^2 + q^2 - 2oq \times \cos(X))} \quad (10)$$

$$\text{where, } \cos(X) = \frac{(2q^2) + o^2 - m^2}{2(2q)o}$$

Similarly, the third distance value (i.e. "d") may be calculated using equation (11), as follows:

$$d = \sqrt{(o^2 + p^2 - 2op \times \cos(D))} \quad (11)$$

The control circuitry 202 may be further configured to estimate angle information (i.e. values of "∠X", "∠Q", and "∠Y") using equations (12), (13), and (14), as follows:

$$X = \cos^{-1}\left(\frac{(2q^2) + o^2 - m^2}{2(2q)o}\right) \quad (12)$$

$$Q = \cos^{-1}\left(\frac{x^2 + o^2 - m^2}{2xo}\right) \quad (13)$$

$$Y = \cos^{-1}\left(\frac{p^2 + x^2 - n^2}{2xp}\right) \quad (14)$$

Figure 6:
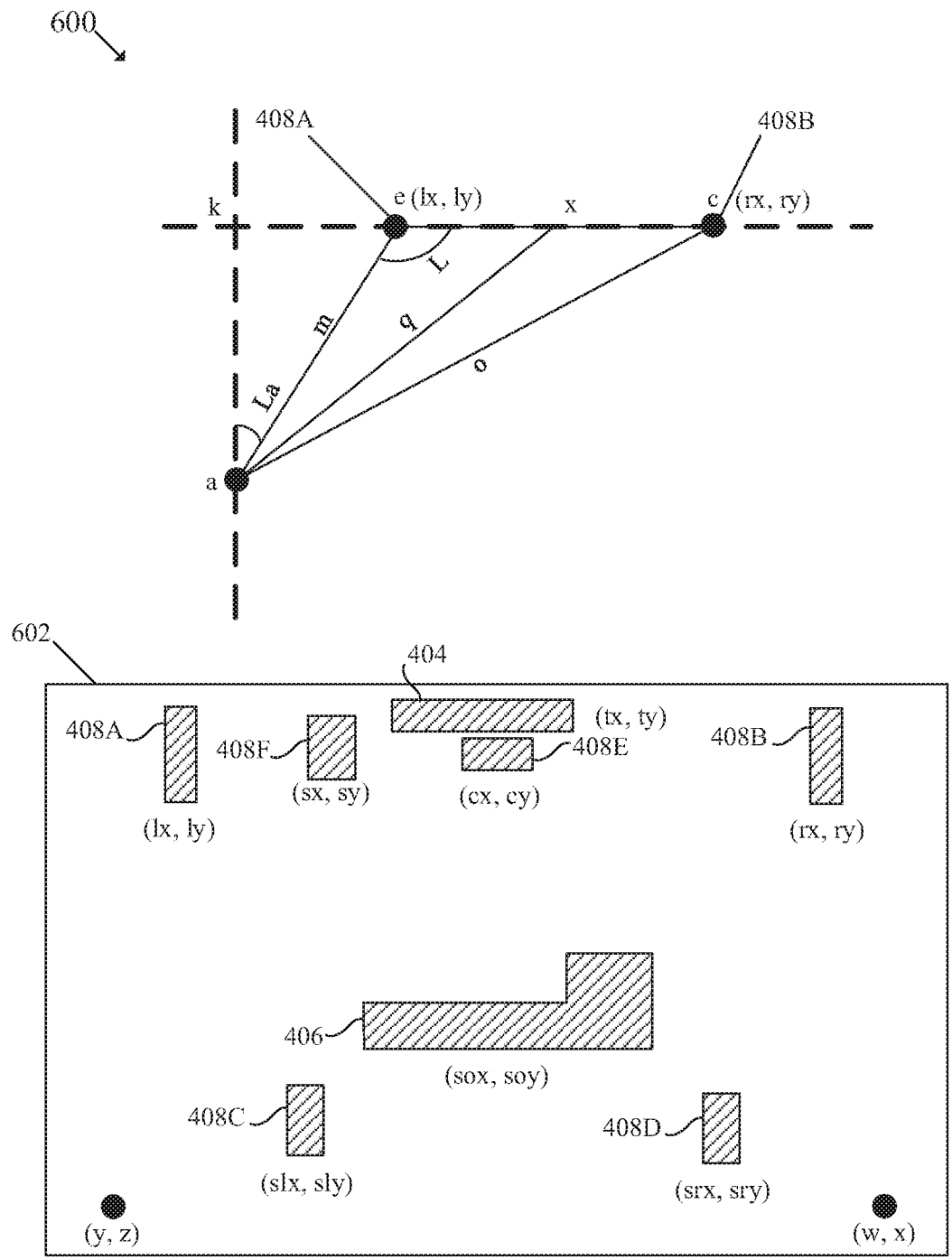
FIG. 6 is a diagram that illustrates exemplary localization of audio devices in an example layout of the audio devices, in accordance with an embodiment of the disclosure.

FIG. 6 is a diagram that illustrates exemplary localization of audio devices in an example layout of the audio devices, in accordance with an embodiment of the disclosure. FIG. 6 is explained in conjunction with elements from FIGS. 1, 2, 3, 4, 5A, and 5B. With reference to FIG. 6, there is shown an example diagram 600 for localization of the plurality of audio devices 408A, 408B, 408C, 408D, 408E, and 408F, as depicted in an example layout 602.

As shown in the example layout 602, the first audio device 408A, the second audio device 408B, the third audio device 408C, the fourth audio device 408D, and the fifth audio device 408E may be at (lx, ly), (rx, ry), (slx, sly), rlx, rly), and (cx, cy), respectively. As further shown in the example layout 602, the display device 404 and the seating structure 406 may be at (tx, ty) and (sox, soy), respectively. The first reference location may be at (y, z) and the second reference location may be at (w, x). The control circuitry 202 may be configured to estimate the first location information ((lx, ly), (rx, ry), (slx, sly), rlx, rly), and (cx, cy)) of the plurality of audio devices 408A, 408B, 408C, 408D, 408E, and 408F. The estimation of first location information may be based on the first reference location (y, z) or the second reference location (w, x). The first reference location (y, z) or the second reference location (w, x) may be determined from GNSS data of the user device 120 when the user 122 captures stereo images from the first reference location (y, z) and the second reference location (w, x). Alternatively, in some embodiments, the first reference location (y, z) or the second reference location (w, x) may be determined without GNSS data. In such instances, the first reference location (y, z) may be considered as (0, 0) (and represented as "a") and the second reference location (w, x) may be considered as (d, 0). The angle between "x" and "m" may be denoted by "L". The angle between "o" and "x" may be denoted by "Q" and the angle between "a-k" and "m" may be denoted by "La".

As an example, the control circuitry 202 may be configured to estimate the location (lx, ly) of the first audio device 408A by using equations (15), (16), (17), and (18), as follows:

$$L = \cos^{-1}\left(\frac{x^2 + m^2 - o^2}{2mx}\right) \quad (15)$$

$$La = 90° - L \quad (16)$$

$$lx = m \times \cos(La) \quad (17)$$

$$ly = m \times \sin(La) \quad (18)$$

Similarly, coordinates of other audio devices may be estimated.

As another example, the first reference location and the second reference location may be determined with the help of GPS data. In such a scenario, the co-ordinates of the first reference location may be (x1, y1) and the co-ordinates of the second reference location may be (x2, y2). The co-ordinates for the first audio device 408 may be estimated using equations (19) and (20), as follows:

$$lx = x1 + m \times \cos(La) \quad (19)$$

$$ly = y1 + m \times \sin(La) \quad (20)$$

Similarly, co-ordinates of other audio devices may be estimated.

The control circuitry 202 may store the calculated co-ordinate for each audio device in the memory 204 as the first location information in the form of, for example, a table. As an example, the first location information as Table 2 may be given as follows:

TABLE 2

| First Location Information | |
|---|---|
| Audio Device | Co-Ordinates |
| First audio device | (lx, ly) |
| Second audio device | (rx, ry) |
| Third audio device | (slx, sly) |
| Fourth audio device | (srx, sry) |
| Fifth audio device | (cx, cy) |
| Sixth audio device | (sx, sy) |

The control circuitry 202 may be further configured to estimate the second location information (tx, ty) of the display device 404 and the third location information (sox, soy) of the seating structure 406. The co-ordinates of the seating structure 406 may be obtained from the GNSS data of the user device 120 based on an assumption that that the user 112 (along with the user device 120) is seated on the seating structure 406.

Figure 7:
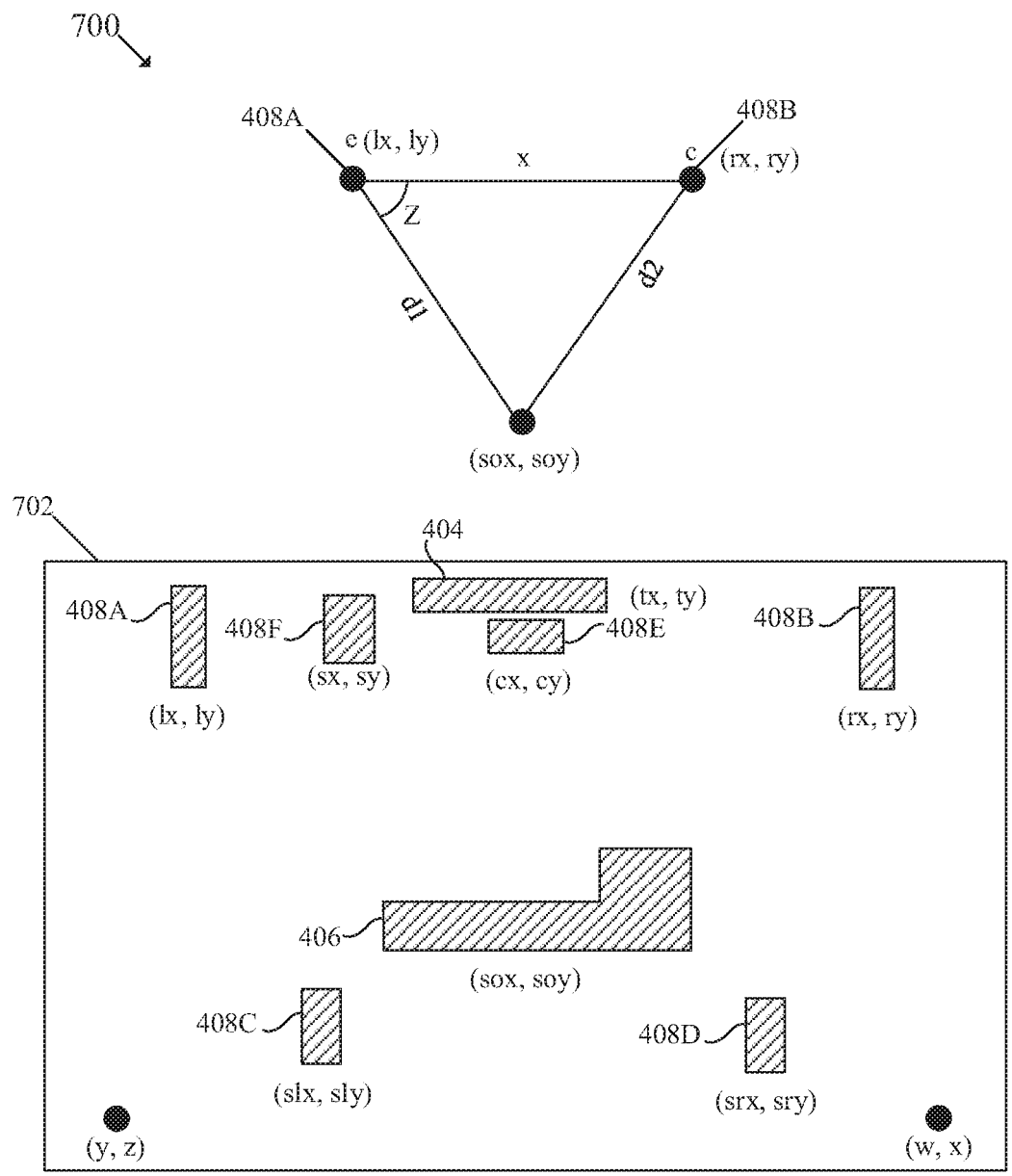
FIG. 7 is a diagram that illustrates exemplary determination of anomaly in connection of audio devices in an example layout of the audio devices, in accordance with an embodiment of the disclosure.

FIG. 7 is a diagram that illustrates exemplary determination of anomaly in connection of audio devices in an example layout of the audio devices, in accordance with an embodiment of the disclosure. FIG. 7 is explained in conjunction with elements from FIGS. 1, 2, 3, 4, 5A, 5B, and 6. With reference to FIG. 7, there is shown an example diagram 700 for determination of an anomaly in connection of one or more audio devices in a layout 702 of the plurality of audio devices 408A, 408B, 408C, 408D, 408E, and 408F.

The control circuitry 202 may be configured to identify the layout 702 of the plurality of audio devices 408A, 408B, 408C, 408D, 408E, and 408F. The layout 702 may depict the plurality of audio devices 408A, 408B, 408C, 408D, 408E, and 408F at their respective locations in the listening environment, with respect to the display device 404, and the seating structure 406. The display device 404 and/or the seating structure 406 may be selected as two references to determine a positional identifier (e.g., L, R, C, SL, SR, etc.) for each audio device of the plurality of audio devices 408A, 408B, 408C, 408D, 408E, and 408F. Additionally, in certain instances, the user location may be also considered as a reference to determine the positional identifier for each audio device of the plurality of audio devices 408A, 408B, 408C, 408D, 408E, and 408F. Examples of the positional identifier may include, but is not limited to, L (left speaker), R (right speaker), C (center speaker), SL (surround left speaker), and SR (surround right speaker).

By way of example, the "x" co-ordinate and "y" co-ordinate of each audio device of the plurality of audio devices 408A, 408B, 408C, 408D, 408E, and 408F may be compared with the "x" co-ordinate and "y" co-ordinate of the display device 404. The positional identifier may be determined as "L" if "x" co-ordinate of an audio device is less than the "x" co-ordinate of the display device 404 and the "y" co-ordinate of the audio device is approximately equal to the "y" co-ordinate of the display device 404. Similarly, if "x" co-ordinate of an audio device is more than the "x" co-ordinate of the display device 404 and the "y" co-ordinate of the audio device is approximately equal to the "y" co-ordinate of the display device 404, the positional identifier may be determined as "R". The positional identifier may be determined as "C" if the "x" co-ordinate of an audio device is same as the value of "x" co-ordinate of the display device 404 and only the "y" co-ordinate of the audio device is different from the "y" co-ordinate of the display device 404.

The "x" co-ordinate of the seating structure 406 may be compared with "x" co-ordinate of each audio device of the plurality of audio devices 408A, 408B, 408C, 408D, 408E, and 408F. The positional identifier may be determined as "SL" if the "x" co-ordinate of the seating structure 406 is greater than the "x" co-ordinate of an audio device. Similarly, if the "x" co-ordinate of the seating structure 406 is less than the "x" co-ordinate of an audio device, the positional identifier may be determined as "SR". The control circuitry 202 may now have information about a positional identifier of each audio device in the listening environment along with their co-ordinates. The control circuitry 202 may store the information in the memory 204 as a table, for example, Table 3, as follows:

TABLE 3

| Positional Identifier of Audio Devices | |
|---|---|
| Positional Identifier | Co-ordinates |
| L | (lx, ly) |
| R | (rx, ry) |
| C | (cx, cy) |
| SL | (slx, sly) |
| SR | (srx, sry) |
| SW | (sx, sy) |

In certain scenarios, the user 122 may be seated on the seating structure 406. In such scenarios, the co-ordinates of the user location may be assumed to be same as the co-ordinates of the seating structure 406. For the sake of brevity, we have considered the co-ordinates of the user location as the co-ordinates (sox, soy) of the seating structure 406. By way of example, a distance between the user location and the first audio device 408A may be denoted by "d1" and the distance between the user location and the second audio device 408B may be denoted by "d2". The distance between the first audio device 408A and the second audio device 408B may be denoted by "x" and the angle between "x" and "d1" may be denoted by "Z". The control circuitry 202 may be configured to calculate the co-ordinate (sox, soy) of the user location based on equations (21) and (22), as follows:

$$sox = lx + d1 \times \cos(Z) \quad (21)$$

$$soy = ly + d1 \times \sin(Z) \quad (22)$$

$$\text{Where, } z = \frac{\cos(x^2 + d1^2 - d2^2)}{2 \cdot d1}$$

At a certain time instant, an audio file may be provided to audio channels (5:1 channels) of the audio reproduction system for playback of the audio file by the audio reproduction system. The control circuitry 202 may receive an audio signal from each audio device of the plurality of audio devices 408A, 408B, 408C, 408D, 408E, and 408F, via a microphone (e.g., a mono-microphone) in the user device 120.

The control circuitry 202 may be further configured to determine the distance between the user location and each audio device of the plurality of audio devices 408A, 408B, 408C, 408D, 408E, and 408F. An example of the distance between the user location and each audio device of the plurality of audio devices 408A, 408B, 408C, 408D, 408E, and 408F is provided in Table 4, as follows:

TABLE 4

| Distance measurements for Audio Devices | |
|---|---|
| Positional Identifier | Distance |
| L | d1 |
| R | d2 |
| SL | d3 |
| SR | d4 |
| C | d5 |

The distance may be determined based on the received audio signal. As an example, the distance between an audio device of the plurality of audio devices 408A, 408B, 408C, 408D, 408E, and 408F and the user location may be determined using TOA measurements of the received audio signal. As another example, the distance between the first audio device 408A and the user location may be determined based on timing signals. The user device 120 may receive a first timing signal from the AVR 410 of the audio reproduction system. The first timing signal may indicate a first time instant at which the audio signal is communicated by the AVR 410 to the first audio device 408A. The audio signal from the first audio device 408A may be recorded at a second time instant by the user device 120 at the user location. An absolute distance between the first audio device 408A and the user device 120 may be determined based on the first and second time instants. Similarly, the distance between each audio device of the plurality of audio devices 408A, 408B, 408C, 408D, 408E, and 408F and the user location may be determined.

In order to determine an anomaly in connection of one or more audio devices, distances estimated based on the audio signal may need to be compared with Euclidean distances between the user location and coordinates (i.e. from Table 3) of the plurality of audio devices 408A, 408B, 408C, 408D, 408E, and 408F. Operations for determination of the anomaly are described herein.

The control circuitry 202 may be configured to estimate a Euclidean distance between the user location and the location (as specified in Table 3) of each audio device. The Euclidean distance between the first audio device 408A and the user location may be denoted by "e1" and may calculated using equation (23), as follows:

$$e1 = \sqrt{(lx-sox)^2 + (ly-soy)^2} \quad (23)$$

Similarly, the Euclidean distance between the second audio device 408B and the user location (sox, soy) may be denoted by "e2" and may be calculated using equation (24), as follows:

$$e1 = \sqrt{(rx-sox)^2 + (ry-soy)^2} \quad (24)$$

The control circuitry 202 may be further configured to compare the Euclidean distance with the distance (e.g., from Table 4) determined based on the received audio signal. As an example, the control circuitry 202 may be configured to compare "d1" with "e1", "d2" with "e2", and the like. In case there is no anomaly in the connection of the first audio device 408A, the Euclidean distance (e1) may be approximately equal to the determined distance (d1). The control circuitry 202 may determine the anomaly in the connection of first audio device 408A with the AVR 410 if d1 is not equal to e1. Euclidean distances (e2, e3, e4 . . . ) and the determined distance (d2, d3, d4 . . . ) for other audio devices may also be compared for inequality to determine the anomaly in their respective connections. In certain embodiments, an audio device, for example, the third audio device 408C may not be connected to the AVR 410. In such a case, a Table 5 may be obtained instead of the Table 4, as follows:

TABLE 5

Distance measurements for Audio Devices

| Positional Identifier | Distance |
|---|---|
| L | d1 |
| R | d2 |
| SL | 0 |
| SR | d4 |
| C | d5 |

In case of d3 being equal to "0", the control circuitry 202 may determine the anomaly in the connection of the third audio device 408C as a missing connection.

The control circuitry 202 may be further configured to generate connection information associated with the plurality of audio devices 408A, 408B, 408C, 408D, 408E, and 408F based on the determined anomaly. The connection information may include information to indicate whether one or more audio devices are determined to have an incorrect connection or a missing connection with the AVR 410. The control circuitry 202 may be further configured to output configuration information for calibration of the plurality of audio devices 408A, 408B, 408C, 408D, 408E, and 408F. The configuration information may include a plurality of fine-tuning parameters for the plurality of audio devices 408A, 408B, 408C, 408D, 408E, and 408F. The plurality of fine-tuning parameters may include, but is not limited to, a delay parameter, a level parameter, an EQ parameter, left/right audio device layout, room environment information, or the anomaly in the connection of the one or more audio devices. The configuration information may be based on one or more of the identified layout, the user location, the estimated first location information, and the generated connection information.

In some embodiments, the configuration information may be based on a type of listening environment. For example, if the listening environment is an auditorium, the control circuitry 202 may adjust the EQ parameter so that the audio content is played with loudness and less bass as a large audience will listen to the audio content. Similarly, if the listening environment is a living room, the control circuitry 202 may adjust the EQ parameter so that the audio content is played with less loudness and high bass. The control circuitry 202 may be further configured to communicate the output configuration information to the AVR 410 so that the AVR 410 may calibrate the one or more audio devices based on the plurality of fine-tuning parameters.

Figure 8:
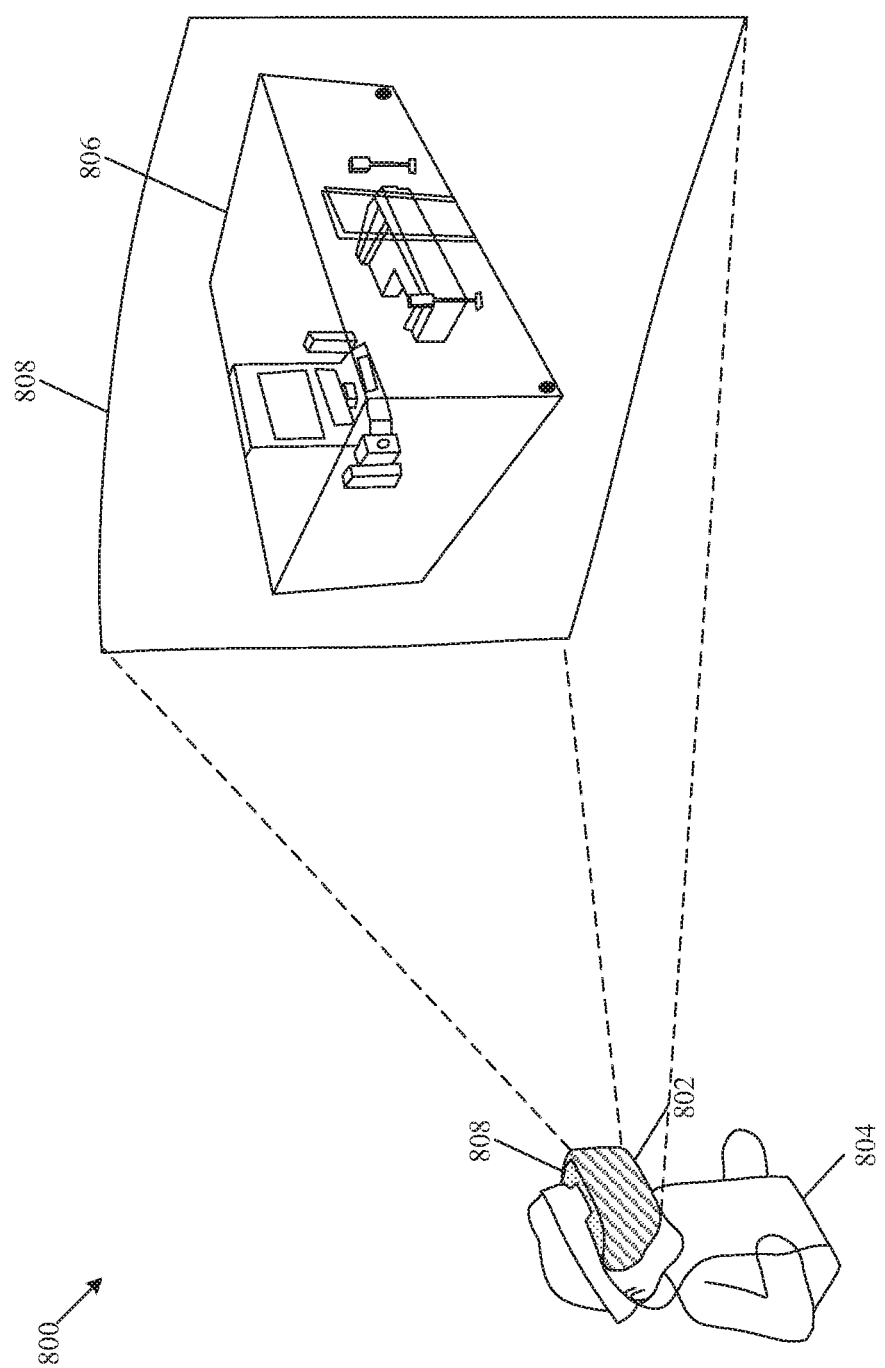
FIG. 8 is diagram that illustrates an exemplary scenario for visualization of an example layout of objects of an example listening environment on a head-mounted device, in accordance with an embodiment of the disclosure.

FIG. 8 is diagram that illustrates an exemplary scenario for visualization of an example layout of objects of an example listening environment on a head-mounted device, in accordance with an embodiment of the disclosure. FIG. 8 is explained in conjunction with elements from FIGS. 1, 2, 3, 4, 5A, 5B, 6, and 7. With reference to FIG. 8, there is shown a diagram of an exemplary scenario 800. In the exemplary scenario 800, there is shown a head-mounted device 802 that is worn by a user 804 (e.g., a technician). The head-mounted device 802 may be used to remotely monitor changes in a layout of the plurality of audio devices 116A, 116B . . . 116N in the listening environment 110.

The control circuitry 202 may be configured to extract a plurality of contours corresponding to the display device 112A, the seating structure 112B, and the plurality of audio devices 116A, 116B . . . 116N. The plurality of contours may be extracted based on the set of stereo images 302A. In general, the contour of an object in a stereo image may represent a boundary or an outline of the object and may be used to localize the object in the stereo image.

The control circuitry 202 may be configured to output a layout map (e.g., obtained at 304B) for the listening environment 110 based on the extracted plurality of contours. The output layout map may be indicative of relative placement of the display device 112A, the seating structure 112B, and the plurality of audio devices 116A, 116B . . . 116N in the listening environment 110. It may be assumed that once the set of stereo images 302A is captured, the relative placement of the plurality of objects in the listening environment 110 remains the same.

The control circuitry 202 may be further configured to generate three-dimensional (3D) information, which may include the output layout map for the listening environment 110. The control circuitry 202 may be further configured to transmit the 3D information to the head-mounted device 802. The head-mounted device 802 may be configured to receive the transmitted 3D information and render a 3D model 806 onto a display 808 of the head-mounted device 802 based on the received 3D information. The 3D model 806 may represent the output layout map of the living environment 110. In at least one embodiment, the head-mounted device 802 may share configuration information for the audio reproduction system 114 to the electronic apparatus 102 based on user inputs provided by the user 804 in the worn state of the head-mounted device 802. The shared configuration information may include audio calibration settings for the plurality of audio devices 116A, 116B . . . 116N and instructions for user(s) in the listening environment to correct any anomaly in connection of audio devices. Based on the shared configuration information, the electronic apparatus 102 may remotely configure the plurality of audio devices 116A, 116B . . . 116N for optimal audio listening experience in the listening environment 110.

Figure 9:
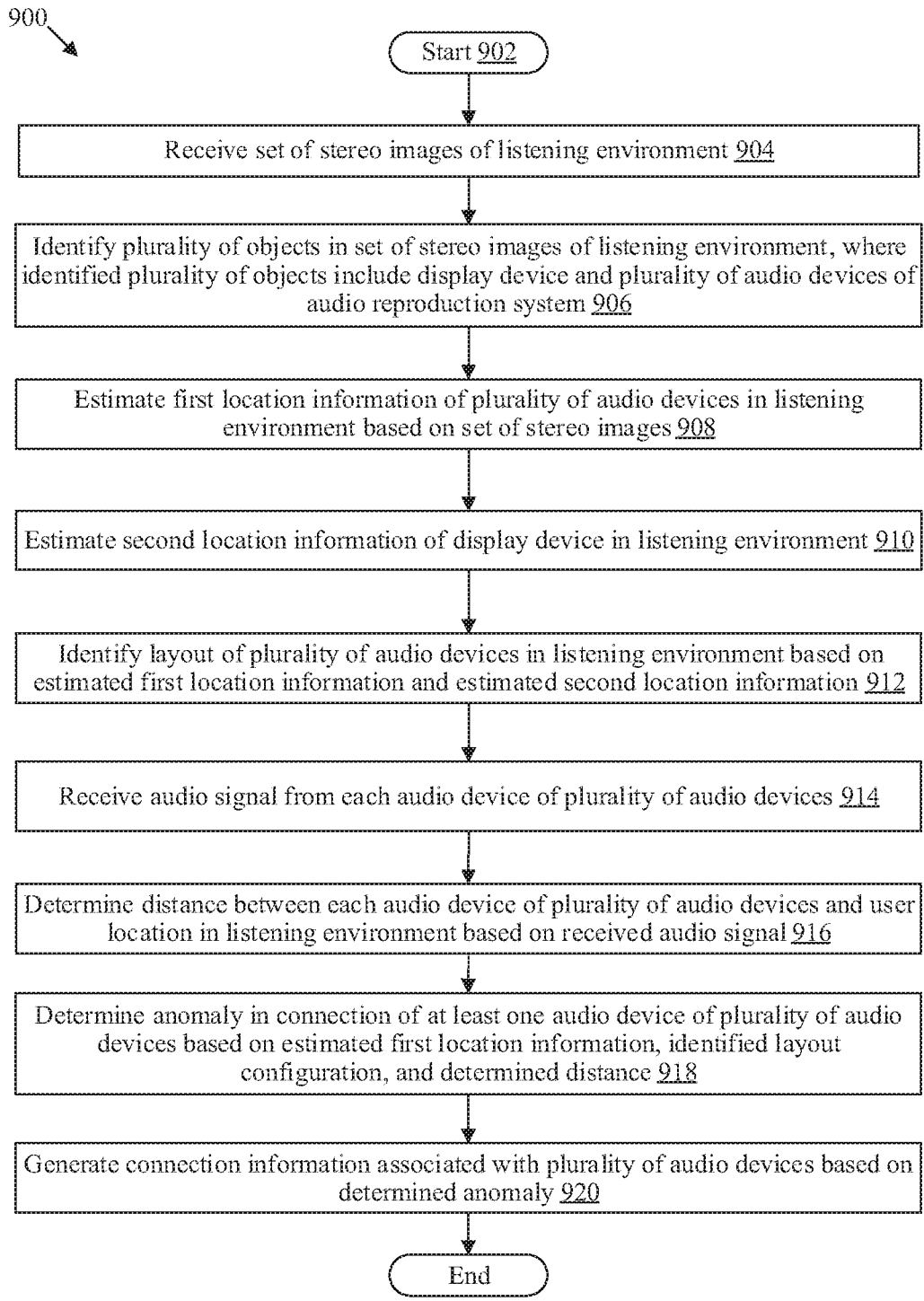
FIG. 9 is a flowchart that illustrates exemplary operations for configuration of an audio reproduction system, in accordance with an embodiment of the disclosure.

FIG. 9 is a flowchart that illustrates exemplary operations for configuration of an audio reproduction system, in accordance with an embodiment of the disclosure. FIG. 9 is explained in conjunction with elements from FIGS. 1, 2, 3, 4, 5A, 5B, 6, 7, and 8. With reference to FIG. 9, there is shown a flowchart 900. The operations from 902 to 920 may be implemented on any computing system, for example, the electronic apparatus 102 of FIG. 2. The operations may start at 902 and proceed to 904.

At 904, a set of stereo images of the listening environment 110 may be received. In one or more embodiments, the control circuitry 202 may be configured to receive the set of stereo images of the listening environment 110.

At 906, a plurality of objects in the set of stereo images of listening environment 110 may be identified. The identified plurality of objects may include the display device 112A and the plurality of audio devices 116A, 116B . . . 116N of an audio reproduction system. In one or more embodiments, the control circuitry 202 may be configured to identify the plurality of objects in the set of stereo images of the listening environment 110 where the identified plurality of objects include the display device 112A and the plurality of audio devices 116A, 116B . . . 116N of the audio reproduction system 114.

At 908, first location information of plurality of audio devices 116A, 116B . . . 116N in listening environment 110 may be estimated. The estimated first location information may be based on the set of stereo images. The process of estimation of the first location information is described in detail, for example, in FIGS. 3 and 6. In one or more embodiments, the control circuitry 202 may be configured to estimate the first location information of the plurality of audio devices 116A, 116B . . . 116N in the listening environment 110 based on the set of stereo images.

At 910, second location information of the display device 112A in the listening environment 110 may be estimated. In one or more embodiments, the control circuitry 202 may be configured to estimate the second location information of the display device 112A in the listening environment 110.

At 912, a layout of the plurality of audio devices 116A, 116B . . . 116N in the listening environment 110 may be identified based on the estimated first location information and the estimated second location information. In one or more embodiments, the control circuitry 202 may be configured to identify the layout of the plurality of audio devices 116A, 116B . . . 116N in listening environment 110 based on the estimated first location information and the estimated second location information.

At 914, an audio signal from each audio device of the plurality of audio devices 116A, 116B . . . 116N may be received. In one or more embodiments, the control circuitry 202 may be configured to receive the audio signal from each audio device of the plurality of audio devices 116A, 116B . . . 116N.

At 916, a distance between each audio device of the plurality of audio devices 116A, 116B . . . 116N and a user location in the listening environment 110 may be determined. The distance may be determined based on the received audio signal. In one or more embodiments, the control circuitry 202 may be configured to determine the distance between each audio device of the plurality of audio devices 116A, 116B . . . 116N and the user location in the listening environment 110 based on the received audio signal.

At 918, an anomaly may be determined in connection of one or more audio devices of the plurality of audio devices 116A, 116B . . . 116N. The determination of the anomaly may be based on the estimated first location information, the identified layout, and the determined distance. The process of determination of anomaly is described in detail, for example, in FIG. 7. In one or more embodiments, the control circuitry 202 may be configured to determine the anomaly in connection of at least one audio device of the plurality of audio devices 116A, 116B . . . 116N based on the estimated first location information, the identified layout, and the determined distance.

At 920, connection information associated with the plurality of audio devices 116A, 116B . . . 116N may be generated. The generated connection information may be based on the determined anomaly. In one or more embodiments, the control circuitry 202 may be configured to generate the connection information associated with the plurality of audio devices 116A, 116B . . . 116N based on the determined anomaly. Control may pass to end.

Various embodiments of the disclosure may provide a non-transitory computer readable medium and/or storage medium having stored thereon, instructions executable by a machine and/or a computer to operate an electronic apparatus. The instructions may cause the machine and/or computer to perform operations that include identification of a plurality of objects in a set of stereo images of a listening environment. The identified plurality of objects may include a display device and a plurality of audio devices of an audio reproduction system. The operations may further include estimation of first location information of the plurality of audio devices in the listening environment, based on the set of stereo images and estimation of second location information of the display device in the listening environment. The operations may further include identification of a layout of the plurality of audio devices in the listening environment, based on the estimated first location information and the estimated second location information. The operations may further include receiving an audio signal from each audio device of the plurality of audio devices and determination of a distance between each audio device of the plurality of audio devices and a user location in the listening environment, based on the received audio signal. The operations may further include determination of an anomaly in connection of at least one audio device of the plurality of audio devices, based on the estimated first location information, the identified layout, and the determined distance. The operations may further include generation of connection information associated with the plurality of audio devices, based on the determined anomaly.

Exemplary aspects of the disclosure may include an electronic apparatus (such as the electronic apparatus 102) that includes control circuitry (such as the control circuitry 202). The control circuitry may be configured identify a plurality of objects in a set of stereo images of a listening environment. The identified plurality of objects may include a display device (such as the display device 112A) and a plurality of audio devices (such as the plurality of audio devices 116A, 116B . . . 116N) of an audio reproduction system (such as the audio reproduction system 114). The audio reproduction system may be an "M:N" surround sound system, where the plurality of audio devices may include "M" number of speakers and "N" number of sub-woofers. The control circuitry may be further configured to estimate first location information of the plurality of audio devices in the listening environment based on the set of stereo images and estimate second location information of the display device in the listening environment. Based on the estimated first location information and the estimated second location information, the control circuitry may be configured to identify a layout of the plurality of audio devices in the listening environment. The control circuitry may be further configured to receive an audio signal (e.g., captured from a mono-microphone of a user device) from each audio device of the plurality of audio devices and determine a distance between each audio device of the plurality of audio devices and a user location in the listening environment based on the received audio signal. Further, the control circuitry may be configured to determine an anomaly in connection of at least one audio device of the plurality of audio devices and generate connection information associated with the plurality of audio devices based on the determined anomaly. The determination of the anomaly may be based on the estimated first location information, the identified layout, and the determined distance.

In accordance with an embodiment, the control circuitry may be further configured to identify the plurality of objects by application of an ML model on the set of stereo images. Additionally, in certain instances, the control circuitry may be further configured to determine a type of listening environment based on the identified plurality of objects.

In accordance with an embodiment, the identified plurality of objects may further include a seating structure (such as the seating structure 112B) in the listening environment. The control circuitry may be further configured to extract a plurality of contours corresponding to the display device, the seating structure, and the plurality of audio devices. The plurality of contours may be extracted based on the set of stereo images. The control circuitry may be further configured to output a layout map for the listening environment based on the extracted plurality of contours. The layout map may be indicative of relative placement of the display device, the seating structure, and the plurality of audio devices in the listening environment.

In accordance with an embodiment, the control circuitry may be further configured to receive a second user input on the output layout map and determine the user location in the listening environment based on the received second user input. The second user input may be indicative of the user location in the listening environment.

In accordance with an embodiment, the electronic apparatus may further include an image-capture device (such as the image-capture device 104) configured to capture the set of stereo images of the listening environment based on a first user input. The set of stereo images may include a first stereo image captured from a first viewpoint of the listening environment and a second stereo image captured from a second viewpoint of the listening environment. The control circuitry may be further configured to determine a first reference location at which the image-capture device captures the first stereo image and a second reference location at which the image-capture device captures the second stereo image. The control circuitry may be further configured to compute a disparity-measure of pixel information from the set of stereo images for each audio device of the plurality of audio devices and compute an in-image location of each audio device of the plurality of audio devices based on computed disparity-measure for the corresponding audio device of the plurality of audio devices.

In accordance with an embodiment, the control circuitry may be further configured to calculate a first distance value between the computed in-image location of each audio device of the plurality of audio devices and the determined first reference location or the determined second reference location. Based the calculated first distance value, the control circuitry may be further configured to calculate a second distance value between a pair of audio devices of the plurality of audio devices. The control circuitry may be further configured to calculate a third distance value between the determined first reference location and the determined second reference location based on the calculated first distance value and the calculated second distance value. The control circuitry may be further configured to estimate angle information for the plurality of audio devices based on the calculated first distance value and one of the calculated second distance value or the calculated third distance value. The angle information may be estimated with respect to a reference axis and may be indicative of a specific direction in which each corresponding audio device of the plurality of audio devices is located in the listening environment with respect to the reference axis. The control circuitry may be configured to estimate the first location information of the plurality of audio devices based on the estimated angle information and the calculated first distance value.

In accordance with an embodiment, the control circuitry may be configured to estimate third location information of a seating structure in the listening environment. The layout of the plurality of audio devices may be identified further based on the estimate third location information.

In accordance with an embodiment, the control circuitry may be further configured to estimate a Euclidean distance between the user location and a location value for each audio device of the plurality of audio devices in the estimated first location information and compare the estimated Euclidean distance with the distance determined based on the received audio signal. Thereafter, the control circuitry may be further configured to determine the anomaly in connection of one or more audio devices of the plurality of audio devices based on the comparison. The determined anomaly may be one of an incorrect connection or a missing connection of the one or more audio devices with an AVR (such as the AVR 118) of the audio reproduction system.

In accordance with an embodiment, the control circuitry may be further configured to output configuration information for calibration of the plurality of audio devices and communicate the output configuration information to the AVR of the audio reproduction system. The configuration information may be generated based on one or more of: the identified layout, the user location, the estimated first location information, and the generated connection information. The communicated configuration information comprises a plurality of fine-tuning parameters, such as, but not limited to, a delay parameter, a level parameter, an EQ parameter, left/right audio device layout, room environment information, or the anomaly in the connection of the one or more audio devices.

In accordance with an embodiment, the control circuitry may be further configured to receive an image of the listening environment via a camera device in the listening environment. The control circuitry may be further configured to determine a change in the user location relative to the layout of the plurality of audio devices based on user detection in the received image. The control circuitry may be further configured to generate the configuration information based on the change in the user location.

In accordance with an embodiment, the control circuitry may be further configured to detect a change in the user location from the listening environment to a different listening environment. The different listening environment may include a different audio reproduction system. The control circuitry may be further configured to share the configuration information generated for the audio reproduction system to the different audio reproduction system. The control circuitry may be further configured to configure the different audio reproduction system in the different listening environment based on the shared configuration information.

In accordance with an embodiment, the control circuitry may be further configured to transmit three-dimensional (3D) information to a head-mounted device. The three-dimensional (3D) information may include the output layout map for the listening environment. The head-mounted device may be configured to receive the transmitted 3D information and render a 3D model representing the output layout map on a display of the head-mounted device based on the received 3D information.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that fall within the scope of the appended claims.

What is claimed is:

1. An electronic apparatus, comprising:
   control circuitry configured to:
      identify a plurality of objects in a set of stereo images of a listening environment,
         wherein the identified plurality of objects comprises a display device and a plurality of audio devices of an audio reproduction system;
      estimate first location information of the plurality of audio devices in the listening environment based on the set of stereo images;
      estimate second location information of the display device in the listening environment;
      identify a layout of the plurality of audio devices in the listening environment based on the estimated first location information and the estimated second location information;
      receive an audio signal from each audio device of the plurality of audio devices;
      determine a distance between each audio device of the plurality of audio devices and a user location in the listening environment based on the received audio signal;
      determine an anomaly in connection of at least one audio device of the plurality of audio devices with an audio-video receiver (AVR) of the audio reproduction system based on the estimated first location information, the identified layout, and the determined distance between each audio device of the plurality of audio devices and the user location; and
      generate connection information associated with the plurality of audio devices based on the determined anomaly.

2. The electronic apparatus according to claim 1, wherein the audio reproduction system is an "M:N" surround sound system, and
   wherein the plurality of audio devices comprises "M" number of speakers and "N" number of sub-woofers.

3. The electronic apparatus according to claim 1, wherein the control circuitry is further configured to identify the plurality of objects by application of a Machine Learning (ML) model on the set of stereo images.

4. The electronic apparatus according to claim 1, wherein the control circuitry is further configured to determine a type of listening environment based on the identified plurality of objects.

5. The electronic apparatus according to claim 1, wherein the identified plurality of objects further comprises a seating structure in the listening environment.

6. The electronic apparatus according to claim 5, wherein the control circuitry is further configured to:
   extract a plurality of contours corresponding to the display device, the seating structure, and the plurality of audio devices,
      wherein the plurality of contours is extracted based on the set of stereo images; and
   output a layout map for the listening environment based on the extracted plurality of contours,
      wherein the layout map is indicative of relative placement of the display device, the seating structure, and the plurality of audio devices in the listening environment.

7. The electronic apparatus according to claim 6, wherein the control circuitry is further configured to:

receive a second user input on the output layout map, wherein the second user input is indicative of the user location in the listening environment; and determine the user location in the listening environment based on the received second user input.

8. The electronic apparatus according to claim 6, wherein the control circuitry is further configured to transmit three-dimensional (3D) information comprising the output layout map for the listening environment to a head-mounted device, and the head-mounted device is configured to:
receive the transmitted 3D information; and
render a 3D model representing the output layout map on a display of the head-mounted device based on the received 3D information.

9. The electronic apparatus according to claim 1, wherein the control circuitry is further configured to:
receive, via a camera device in the listening environment, an image of the listening environment; and
determine a change in the user location relative to the layout of the plurality of audio devices based on user detection in the received image.

10. The electronic apparatus according to claim 1, further comprising an image-capture device configured to capture the set of stereo images of the listening environment based on a first user input,
wherein the set of stereo images comprises a first stereo image captured from a first viewpoint of the listening environment and a second stereo image captured from a second viewpoint of the listening environment.

11. The electronic apparatus according to claim 10, the control circuitry is further configured to:
determine a first reference location at which the image-capture device captures the first stereo image; and
determine a second reference location at which the image-capture device captures the second stereo image.

12. The electronic apparatus according to claim 11, wherein the control circuitry is further configured to:
compute a disparity-measure of pixel information from the set of stereo images for each audio device of the plurality of audio devices; and
compute an in-image location of each audio device of the plurality of audio devices based on the computed disparity-measure for a corresponding audio device of the plurality of audio devices.

13. The electronic apparatus according to claim 12, wherein the control circuitry is further configured to:
calculate a first distance value between the computed in-image location of each audio device of the plurality of audio devices and one of the determined first reference location or the determined second reference location;
calculate a second distance value between a pair of audio devices of the plurality of audio devices based the calculated first distance value; and
calculate a third distance value between the determined first reference location and the determined second reference location based on the calculated first distance value and the calculated second distance value.

14. The electronic apparatus according to claim 13, wherein the control circuitry is further configured to estimate angle information for the plurality of audio devices based on the calculated first distance value and one of the calculated second distance value or the calculated third distance value.

15. The electronic apparatus according to claim 14, wherein the angle information is estimated with respect to a reference axis, and
wherein the estimated angle information is indicative of a specific direction in which each corresponding audio device of the plurality of audio devices is located in the listening environment with respect to the reference axis.

16. The electronic apparatus according to claim 14, wherein the control circuitry is further configured to estimate the first location information of the plurality of audio devices based on the estimated angle information and the calculated first distance value.

17. The electronic apparatus according to claim 1, wherein the control circuitry is further configured to estimate third location information of a seating structure in the listening environment.

18. The electronic apparatus according to claim 17, wherein the control circuitry is further configured to identify the layout of the plurality of audio devices based on the estimated third location information.

19. The electronic apparatus according to claim 1, wherein the audio signal is received from a mono-microphone of a user device.

20. The electronic apparatus according to claim 1, wherein the control circuitry is further configured to:
estimate a Euclidean distance between the user location and a location value for each audio device of the plurality of audio devices in the estimated first location information;
compare the estimated Euclidean distance with the determined distance between each audio device of the plurality of audio devices and the user location; and
determine the anomaly in the connection of the at least one audio device of the plurality of audio devices based on the comparison,
wherein the determined anomaly is one of an incorrect connection or a missing connection of the at least one audio device with the AVR.

21. The electronic apparatus according to claim 1, wherein the control circuitry is further configured to:
output configuration information for calibration of the plurality of audio devices based on at least one of the identified layout, the user location, the estimated first location information, or the generated connection information; and
communicate the output configuration information to the AVR.

22. The electronic apparatus according to claim 21, wherein the configuration information comprises a plurality of fine-tuning parameters, and
wherein the plurality of fine-tuning parameters comprises at least one of a delay parameter, a level parameter, an equalization (EQ) parameter, left/right audio device layout, room environment information, or the anomaly in the connection of the at least one audio device.

23. The electronic apparatus according to claim 21, wherein the control circuitry is further configured to:
detect a change in the user location from the listening environment to a different listening environment comprising a different audio reproduction system;
share the configuration information generated for the audio reproduction system, to the different audio reproduction system; and
configure the different audio reproduction system in the different listening environment based on the shared configuration information.

24. A method, comprising:

in an electronic apparatus:

- identifying a plurality of objects in a set of stereo images of a listening environment,
  - wherein the identified plurality of objects comprises a display device and a plurality of audio devices of an audio reproduction system;
- estimating first location information of the plurality of audio devices in the listening environment based on the set of stereo images;
- estimating second location information of the display device in the listening environment;
- identifying a layout of the plurality of audio devices in the listening environment based on the estimated first location information and the estimated second location information;
- receiving an audio signal from each audio device of the plurality of audio devices;
- determining a distance between each audio device of the plurality of audio devices and a user location in the listening environment based on the received audio signal;
- determining an anomaly in connection of at least one audio device of the plurality of audio devices with an audio-video receiver (AVR) of the audio reproduction system based on the estimated first location information, the identified layout, and the determined distance between each audio device of the plurality of audio devices and the user location; and
- generating connection information associated with the plurality of audio devices based on the determined anomaly.

* * * * *